(12) United States Patent
Elliott et al.

(10) Patent No.: US 7,798,557 B2
(45) Date of Patent: *Sep. 21, 2010

(54) VEHICLE UNGUIDED FOUR-BAR REAR DOOR ARTICULATING AND SLIDING MECHANISM

(75) Inventors: Adrian N. A. Elliott, Dearborn, MI (US); Justin T. Johnson, Dearborn, MI (US); Jason Falenski, Berkley, MI (US); Henry Hausler, Manchester, MI (US); Dave M. Lechkun, Shelbytownship, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/948,378

(22) Filed: Nov. 30, 2007

(65) Prior Publication Data

US 2009/0051194 A1 Feb. 26, 2009

Related U.S. Application Data

(60) Provisional application No. 60/935,581, filed on Aug. 20, 2007.

(51) Int. Cl.
*B60J 5/04* (2006.01)
*E05D 7/084* (2006.01)

(52) U.S. Cl. .............. 296/146.12; 296/146.11; 296/155; 16/362; 49/250; 49/254

(58) Field of Classification Search ............ 296/146.11, 296/146.12, 146.4, 155; 16/362, 364, 230, 16/231; 49/176, 246, 250, 254, 209, 216, 49/218

See application file for complete search history.

(56) References Cited

U.S. PATENT DOCUMENTS

| 3,051,999 A | 9/1962 | Schimek |
| 3,075,803 A | 1/1963 | Wilfert |
| 3,313,063 A | 4/1967 | Patin |
| 3,619,853 A | 11/1971 | Merrill |

(Continued)

FOREIGN PATENT DOCUMENTS

DE 3831698 A1 3/1990

(Continued)

*Primary Examiner*—Patricia L Engle
(74) *Attorney, Agent, or Firm*—Gregory P. Brown; Price, Heneveld, Cooper, DeWitt & Litton, LLP

(57) ABSTRACT

A vehicle rear door articulating and sliding mechanism including an articulating hinge assembly having a hinge arm pivotally mounted to a vehicle C-pillar at one end thereof, and a vehicle rear door pivotally and slidably mounted to the hinge arm at an opposite end of the hinge arm. A guide track may be mounted to the rear door, and a slide block may be pivotally mounted to the hinge arm and slidably attached to the guide track. The hinge arm may be disposed at first and second angular positions relative to the guide track when the rear door is respectively disposed in closed and opened positions, and the slide block may be disposed at first and second positions along a length of the guide track when the rear door is respectively disposed in the closed and opened positions, to thus provide articulating and sliding movement of the rear door.

15 Claims, 25 Drawing Sheets

U.S. PATENT DOCUMENTS

| | | | |
|---|---|---|---|
| 3,628,216 A | 12/1971 | Savell | |
| 3,758,990 A | 9/1973 | Balanos | |
| 3,935,674 A * | 2/1976 | Williams et al. | 49/212 |
| 4,025,104 A * | 5/1977 | Grossbach et al. | 296/155 |
| 4,135,760 A * | 1/1979 | Grossbach | 296/155 |
| 4,719,665 A | 1/1988 | Bell | |
| 4,945,677 A | 8/1990 | Kramer | |
| 5,139,307 A | 8/1992 | Koops et al. | |
| 5,251,953 A | 10/1993 | Willey | |
| 5,398,988 A | 3/1995 | DeRees et al. | |
| 5,474,344 A | 12/1995 | Lee | |
| 5,507,119 A * | 4/1996 | Sumiya et al. | 49/218 |
| 5,561,887 A | 10/1996 | Neag et al. | |
| 5,812,684 A | 9/1998 | Mark | |
| 5,846,463 A | 12/1998 | Keeney et al. | |
| 5,896,704 A | 4/1999 | Neag et al. | |
| 5,921,613 A * | 7/1999 | Breunig et al. | 296/155 |
| 6,030,025 A | 2/2000 | Kanerva | |
| 6,036,257 A | 3/2000 | Manuel | |
| 6,183,039 B1 * | 2/2001 | Kohut et al. | 296/155 |
| 6,196,618 B1 | 3/2001 | Pietryga et al. | |
| 6,213,535 B1 | 4/2001 | Landmesser et al. | |
| 6,299,235 B1 | 10/2001 | Davis et al. | |
| 6,382,705 B1 | 5/2002 | Lang et al. | |
| 6,394,529 B2 | 5/2002 | Davis et al. | |
| 6,447,054 B1 | 9/2002 | Pietryga et al. | |
| 6,572,176 B2 | 6/2003 | Davis et al. | |
| 6,609,748 B1 | 8/2003 | Azzouz et al. | |
| 6,629,337 B2 | 10/2003 | Nania | |
| 6,793,268 B1 | 9/2004 | Faubert et al. | |
| 6,802,154 B1 | 10/2004 | Holt et al. | |
| 6,817,651 B2 | 11/2004 | Carvalho et al. | |
| 6,826,869 B2 | 12/2004 | Oberheide | |
| 6,860,543 B2 | 3/2005 | George et al. | |
| 6,896,315 B2 | 5/2005 | Batinli et al. | |
| 6,926,342 B2 | 8/2005 | Pommeret et al. | |
| 6,942,277 B2 | 9/2005 | Rangnekar et al. | |
| 6,997,504 B1 * | 2/2006 | Lang et al. | 296/146.11 |
| 7,000,977 B2 * | 2/2006 | Anders | 296/155 |
| 7,003,915 B2 | 2/2006 | Yokomori | |
| 7,032,953 B2 | 4/2006 | Rangnekar et al. | |
| 7,104,588 B2 | 9/2006 | George et al. | |
| 7,168,753 B1 | 1/2007 | Faubert et al. | |
| 7,178,853 B2 | 2/2007 | Oxley et al. | |
| 7,219,948 B2 | 5/2007 | Curtis, Jr. et al. | |
| 7,243,978 B2 | 7/2007 | Mather et al. | |
| 7,383,614 B2 | 6/2008 | Matsuki | |
| 7,393,044 B2 | 7/2008 | Enomoto | |
| 7,469,944 B2 | 12/2008 | Kitayama et al. | |
| 7,552,953 B2 | 6/2009 | Schmoll et al. | |
| 7,611,190 B1 | 11/2009 | Elliott et al. | |
| 7,636,985 B2 | 12/2009 | Greenbank | |
| 7,640,627 B2 | 1/2010 | Lowen et al. | |
| 7,658,438 B1 | 2/2010 | Elliott et al. | |
| 2002/0096800 A1 | 7/2002 | Keeney et al. | |
| 2003/0218358 A1 * | 11/2003 | Hahn | 296/155 |
| 2005/0093337 A1 | 5/2005 | Herrmann et al. | |
| 2005/0116496 A1 | 6/2005 | Lowson et al. | |
| 2005/0146159 A1 | 7/2005 | Shen et al. | |
| 2006/0059799 A1 | 3/2006 | Zimmer et al. | |
| 2006/0103047 A1 | 5/2006 | Zwolinski | |
| 2006/0249983 A1 | 11/2006 | Heuel et al. | |
| 2006/0267375 A1 | 11/2006 | Enomoto | |
| 2007/0075565 A1 | 4/2007 | Magsaam | |
| 2007/0085374 A1 | 4/2007 | Mather et al. | |
| 2007/0214606 A1 | 9/2007 | Hoffman | |
| 2008/0190028 A1 | 8/2008 | Oxley | |
| 2008/0224501 A1 | 9/2008 | Zimmer et al. | |
| 2009/0000200 A1 | 1/2009 | Heuel et al. | |
| 2009/0070960 A1 | 3/2009 | Elliott et al. | |
| 2009/0072582 A1 | 3/2009 | Elliott et al. | |
| 2009/0072583 A1 | 3/2009 | Elliott et al. | |
| 2009/0200833 A1 | 8/2009 | Heuel et al. | |
| 2010/0127530 A1 | 5/2010 | Elliott et al. | |
| 2010/0154313 A1 | 6/2010 | Elliott et al. | |

FOREIGN PATENT DOCUMENTS

| | | |
|---|---|---|
| DE | 102004039885 A1 | 2/2006 |
| EP | 0012511 A1 | 6/1980 |
| EP | 0875434 A1 | 11/1998 |
| EP | 0957019 A2 | 11/1999 |
| EP | 1813759 A1 | 8/2007 |
| GB | 389061 | 5/1931 |
| JP | 3140583 A | 6/1991 |
| JP | 3140584 A | 6/1991 |
| JP | 2004175199 A | 6/2004 |
| JP | 2005153738 A | 6/2005 |
| JP | 2007138630 A | 6/2007 |
| JP | 2008094323 A | 4/2008 |
| KR | 100448753 B1 | 9/2004 |
| WO | 0242589 A1 | 5/2002 |
| WO | 2006005572 A1 | 1/2006 |

* cited by examiner

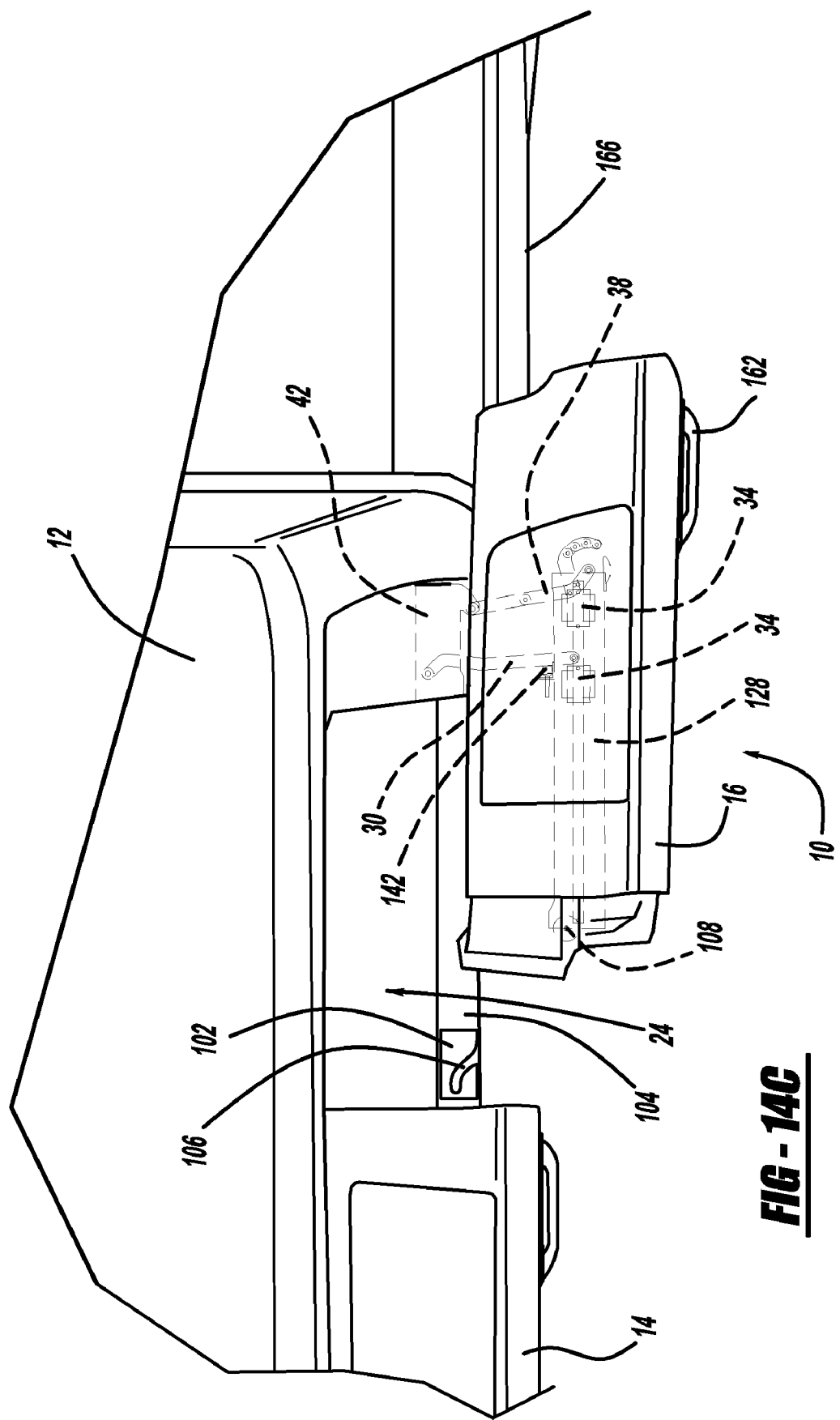

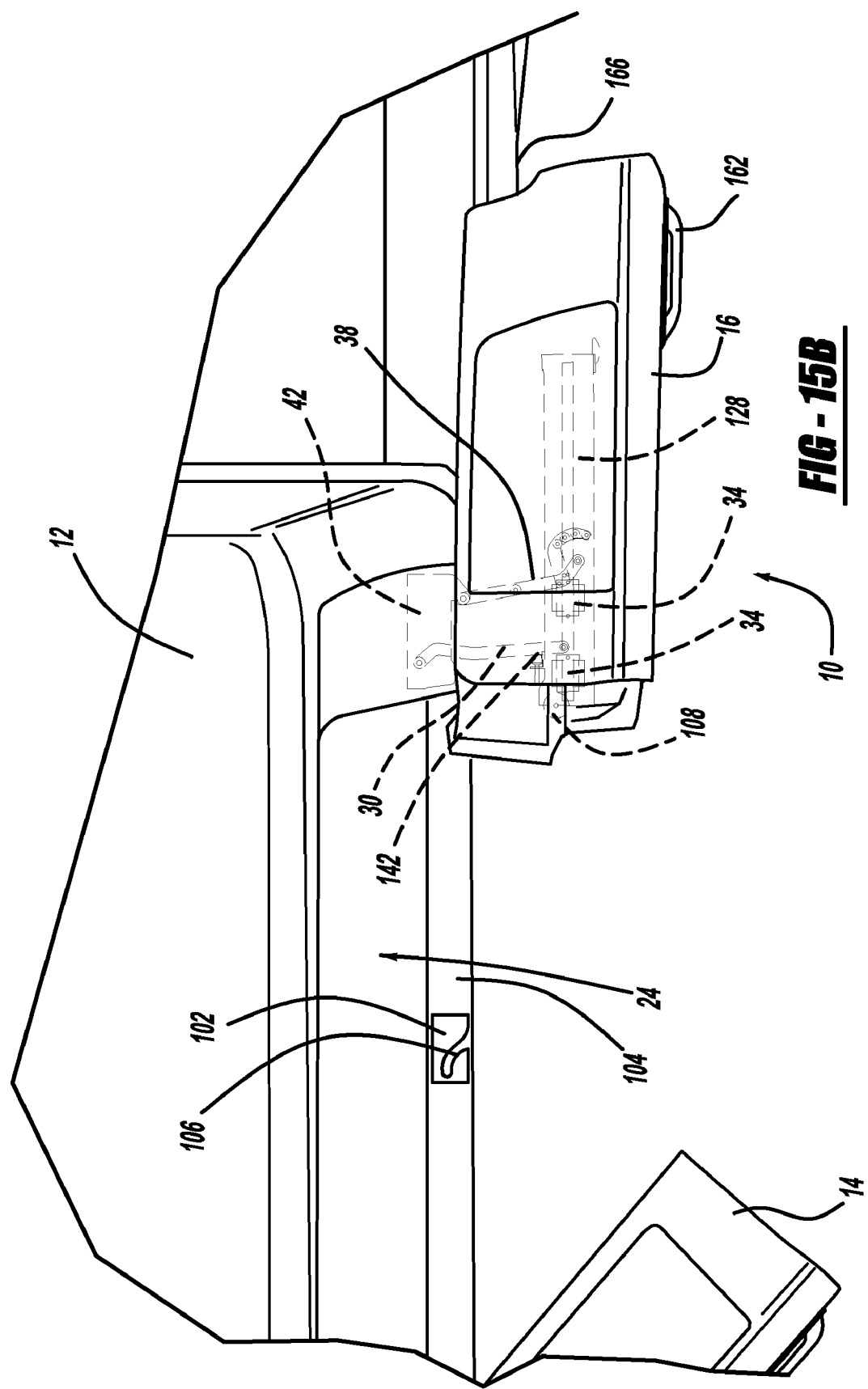

VEHICLE UNGUIDED FOUR-BAR REAR DOOR ARTICULATING AND SLIDING MECHANISM

RELATED APPLICATIONS

This application claims benefit of priority of Provisional Application Ser. No. 60/935,581 filed Aug. 20, 2007, hereby incorporated by reference in its entirety.

BACKGROUND OF INVENTION a. Field of Invention

The invention relates generally to vehicle door movement control devices, and, more particularly, to a mechanism for enabling vehicle rear door articulation and sliding, for example, in a pickup truck, with the mechanism permitting opening and closing of a rear door with or without a front door being opened.

b. Description of Related Art

As is known in the art, automobile designs are governed by a variety of ergonomic and operational factors. For doors and other such components, the design is generally based on ergonomic factors such as exterior appearance, and the location and visibility of hinges, latches and adjacent components, and operational factors such as the ingress/egress opening provided, the maximum clearance required for opening/closing a door, and crash performance.

For pickup trucks, sport-utility vehicles (SUVs) and other such vehicles which are designed to accommodate ingress/egress of several passengers and also provide means for transport of large goods, the ingress/egress opening and maximum clearance required for opening/closing a door can be of particular importance. For example, a typical pickup truck having front and back driver/passenger doors may include a C-pillar mounted rear door which pivots relative to the C-pillar in a similar manner as the A-pillar mounted front door to thus provide a relatively large and unobstructed ingress/egress opening without the intermediate B-pillar. Due to the large size of a typical pickup truck, driver/passenger ingress/egress can become particularly restrictive, if not impossible, if a vehicle is parked adjacent to the truck and is sufficiently close to prevent a person from boarding or loading to enter the area between the front and rear doors (when open), invariably known as parking lot entrapment.

In an effort to address such parking lot entrapment concerns, a host of sliding or articulating rear door designs, such as the design disclosed in U.S. Pat. No. 6,183,039 to Kohut, have been proposed.

Specifically, referring to FIGS. 1-11 of Kohut, Kohut discloses pivot and slide door system (20) having pivot assembly (60) to pivot door (36) outward from a closed position disposed within door opening (26) to a pivot position spaced from vehicle body (24). Pivot assembly (60) includes a pair of lower arms (64) pivotally attached to support member (62). Lower arms (64) have one end disposed within channel (65) of support member (62) and are attached to support member (62) by pin (66). Pivot assembly (60) includes at least one upper arm (68), aligned with front lower arm (64). Upper arm (68) extends laterally and is pivotally connected to support strap (70) by pin (72). Pivot and slide door system (20) includes lower slide assembly (76), connected to lower arms (64) to allow door (36) to slide rearward to allow ingress/egress via door opening (26). Lower slide assembly (76) includes lower track (78) extending longitudinally along a lower portion of door (36). Upper slide assembly (96), connected to upper arm (68), includes upper track (98) extending longitudinally along an upper portion of door (36). Interlock assembly (110) is used to lock and release lower slide assembly (76) to lower pivot assembly (60) to prevent and allow door (36) to slide fore/aft. Interlock assembly (110) prevents door (36) from moving in a fore/aft direction before lower pivot assembly (76) has moved to its fully open rotational position.

Thus while pivot and slide door system (20) of Kohut provides for articulating and sliding movement of door (36), system (20) and especially interlock assembly (110) nevertheless are relatively complex in design, and thus susceptible to failure. As system (20) is illustrated for use with a single car door, Kohut does not discuss whether door (36) is pivotally operable with a vehicle having a front door.

It would therefore be of benefit to provide a mechanism for permitting opening and closing of a rear door with or without a front door being opened, with the mechanism including a minimal number of components for facilitating manufacture, assembly and operation of the overall mechanism and adjacent components.

SUMMARY OF INVENTION

The invention overcomes the drawbacks and deficiencies of prior art articulating door mechanisms by providing a vehicle rear door articulating and sliding mechanism including one or more articulating hinge assemblies having one or more hinge arms pivotally mounted to a vehicle C-pillar at one end thereof and a vehicle rear door pivotally and slidably mounted to the hinge arm at an opposite end of the hinge arm. The mechanism may further include one or more guide tracks mounted to the vehicle rear door, and one or more slide blocks pivotally mounted to the hinge arm and slidably attached to the guide track. Based on the configuration above, the hinge arm may be disposed at first and second angular positions relative to the guide track when the vehicle rear door is respectively disposed in closed and opened positions, and the slide block may be disposed at first and second positions along a length of the guide track when the vehicle rear door is respectively disposed in the closed and opened positions. The vehicle rear door articulating and sliding mechanism thus provides articulating movement of the vehicle rear door, independent of a vehicle front door, during initial opening thereof and further provides sliding movement of the vehicle rear door relative to the vehicle body during continued opening thereof.

In an exemplary embodiment, the vehicle rear door articulating and sliding mechanism may include a single or dual hinge, designed as a four-bar mechanism of unequal arm lengths, connected to the rear end of the door and for connection to a C-pillar of a vehicle body to allow the rear end (trailing edge) of the rear door to articulate open, through an arc representing 90° degrees or greater relative to a vehicle A-B line. The articulation of the four-bar mechanism involving unequal length arms allows the front end (leading edge) to be drawn away from the point of contact (interface) to the front door prior to rotation or swing of the leading edge of the door. The articulation of the four-bar mechanism allows the complete door assembly to be rotated clear of the door opening prior to commencement of a sliding motion in a rearward direction. A check (i.e. articulation and slide control mechanism discussed below) may prevent rotation beyond the required angle and place the door in a position to slide, parallel to vehicle body. The sliding motion may be facilitated by means of a linear guideway, involving a bearing pack and guide rails, conventional polymer wheels within a guiding track, or any other means of conveying the door in a fore-aft direction. Stability of the door in both a fore and aft and in and out direction may be maintained through a structural framework built into the door. The door on closing may be guided using a track mounted on a front bottom surface of the door, for which a front striker may slide through this to engage the latch mounted at the rear of the track.

For the vehicle rear door articulating and sliding mechanism described above, the slide block may be pivotally mounted to the opposite end of the hinge arm, and the opposite end of the hinge arm may further include a fixedly mounted curved finger engageable with a complementary curved lockout tab provided on the vehicle rear door for preventing sliding movement of the vehicle rear door. The curved finger may be disengageable from the complementary curved lockout tab for allowing articulating movement of the vehicle rear door. The curved finger may include one or more rollers engageable with the complementary curved lockout tab. The vehicle rear door articulating and sliding mechanism may further include a guide assembly including a vehicle roof mounted guide track and a guide arm mounted to the vehicle rear door and having a follower slidable relative to the vehicle roof mounted guide track for facilitating guided movement of the vehicle rear door. Alternatively, the guide assembly may include a vehicle floor mounted guide track and a guide arm mounted to the vehicle rear door and having a follower slidable relative to the vehicle floor mounted guide track for facilitating guided movement of the vehicle rear door. The mechanism may further include one or more upper and lower hinge assemblies each respectively including at least two hinge arms for forming a multi-bar articulating and sliding mechanism. The mechanism may also include a tie-rod connected to an upper and lower hinge arm for thereby providing rigidity for simultaneous operation of upper and lower hinge assemblies.

The invention also provides a vehicle door articulating and sliding mechanism including one or more articulating hinge assemblies having one or more hinge arms pivotally mounted to a vehicle body structure at one end thereof, a vehicle door pivotally and slidably mounted to the hinge arm at an opposite end of the hinge arm, one or more guide tracks mounted to the vehicle door, and one or more slide blocks pivotally mounted to the hinge arm and slidably attached to the guide track. The hinge arm may be disposed at first and second angular positions relative to the guide track when the vehicle door is respectively disposed in closed and opened positions, and the slide block may be disposed at first and second positions along a length of the guide track when the vehicle door is respectively disposed in the closed and opened positions. The vehicle door articulating and sliding mechanism thus provides articulating movement of the vehicle door during initial opening thereof and further provides sliding movement of the vehicle door relative to the vehicle body during continued opening thereof.

For the vehicle door articulating and sliding mechanism described above, the mechanism provides articulating movement of the vehicle door, independent of a vehicle adjacent door. The slide block may be pivotally mounted to the opposite end of the hinge arm, and the opposite end of the hinge arm may further include a fixedly mounted curved finger engageable with a complementary curved lockout tab provided on the vehicle door for preventing sliding movement of the vehicle door. The curved finger may be disengageable from the complementary curved lockout tab for allowing articulating movement of the vehicle door. In a particular embodiment, the curved finger may include one or more rollers engageable with the complementary curved lockout tab for a particular embodiment, the vehicle door articulating and sliding mechanism may further include a guide assembly including a vehicle roof mounted guide track and a guide arm mounted to the vehicle door and having a follower slidable relative to the vehicle roof mounted guide track for facilitating guided movement of the vehicle door. Alternatively, the mechanism may include a guide assembly including a vehicle floor mounted guide track and a guide arm mounted to the vehicle door and having a follower slidable relative to the vehicle floor mounted guide track for facilitating guided movement of the vehicle door. The mechanism may further include one or more upper and lower hinge assemblies each respectively including at least two hinge arms for forming a multi-bar articulating and sliding mechanism. Moreover, the mechanism may further include a tie-rod connected to an upper and lower hinge arm for thereby providing rigidity for simultaneous operation of upper and lower hinge assemblies.

The invention yet further provides a vehicle compartment closure articulating and sliding mechanism including one or more articulating hinge assemblies including one or more hinge arms pivotally mounted to a vehicle body structure at one end thereof, a compartment closure pivotally and slidably mounted to the hinge arm at an opposite end of the hinge arm, one or more guide tracks mounted to the compartment closure, and one or more slide blocks pivotally mounted to the hinge arm and slidably attached to the guide track. The hinge arm may be disposed at first and second angular positions relative to the guide track when the compartment closure is respectively disposed in closed and opened positions, and the slide block may be disposed at first and second positions along a length of the guide track when the compartment closure is respectively disposed in the closed and opened positions. The compartment closure articulating and sliding mechanism thus provides articulating movement of the compartment closure during initial opening thereof and further provides sliding movement of the compartment closure relative to a vehicle body structure during continued opening thereof.

For the vehicle compartment closure articulating and sliding mechanism described above, the slide block may be pivotally mounted to the opposite end of the hinge arm, and the opposite end of the hinge arm may further include a fixedly mounted curved finger engageable with a complementary curved lockout tab provided on the compartment closure for preventing sliding movement of the compartment closure. The curved finger may be disengageable from the complementary curved lockout tab for allowing articulating movement of the compartment closure. In a particular embodiment, the curved finger may include one or more rollers engageable with the complementary curved lockout tab. The mechanism may further include one or more hinge assemblies each respectively including at least two hinge arms for forming a multi-bar articulating and sliding mechanism. The mechanism may also include a tie-rod connected to at least two hinge arms for thereby providing rigidity for simultaneous operation of at least two hinge assemblies respectively including the hinge arms.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIGS. 14A-14D are top views of a vehicle including the rear door articulating and sliding mechanism of FIG. 1, respectively illustrating the rear vehicle door in a closed, just beginning to open, opened midway and fully opened positions, with the front vehicle door closed;

FIGS. 15A and 15B are top views of a vehicle including the rear door articulating and sliding mechanism of FIG. 1, respectively illustrating the rear vehicle door in a just beginning to open and fully opened positions, with the front vehicle door open;

DETAILED DESCRIPTION OF THE PREFERRED EMBODIMENTS

Figure 1:
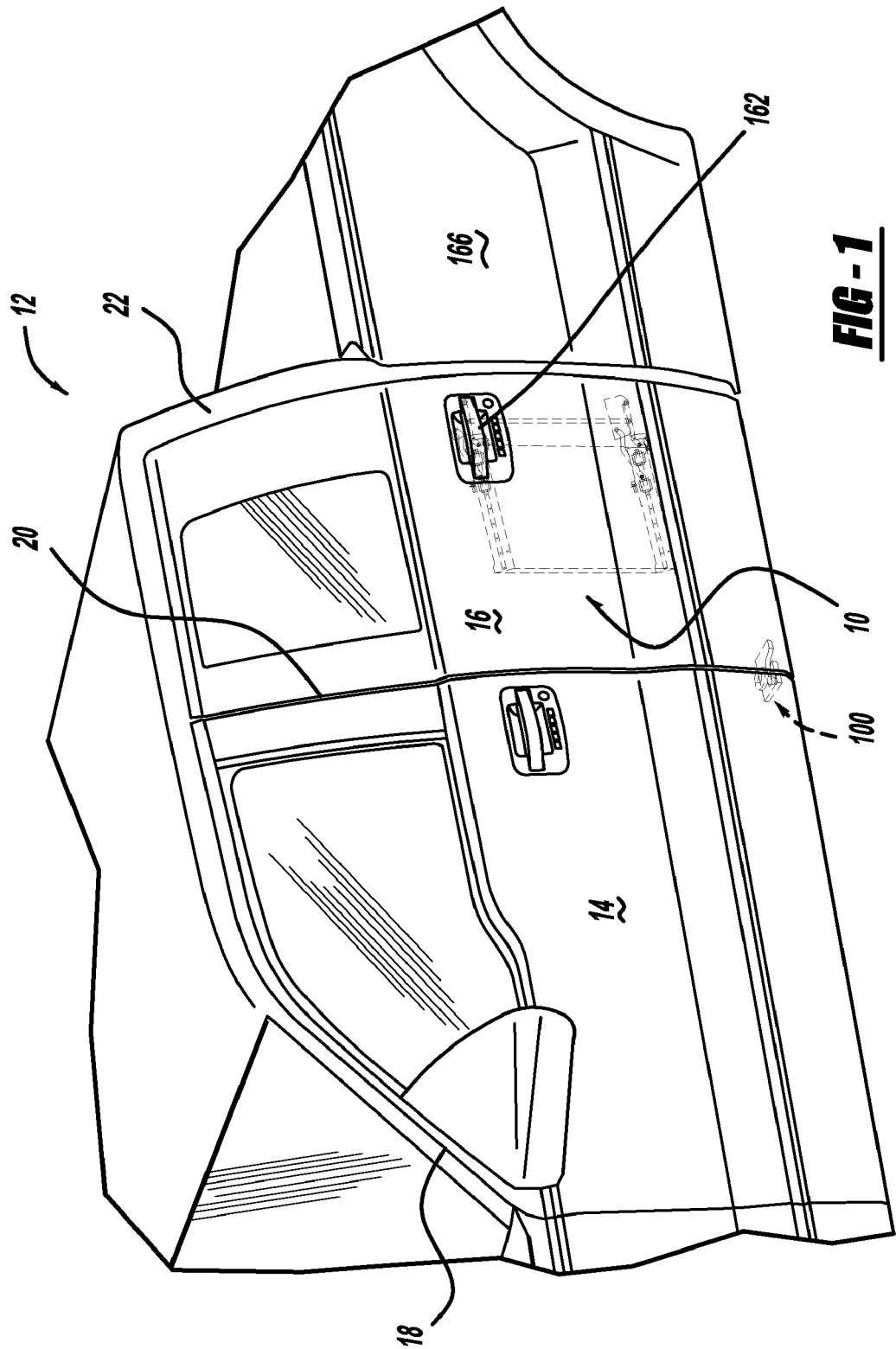
FIG. 1 is an isometric view of a rear door articulating and sliding mechanism according to the present invention, illustrating the mechanism in an assembled configuration and installed onto a vehicle (the mechanism being shown in hidden)

Referring now to the drawings wherein like reference numerals designate corresponding parts throughout the several views, FIGS. 1-18B illustrate a mechanism for vehicle rear door articulation and sliding according to the present invention, generally designated "rear door articulating and sliding mechanism 10."

Figure 2:
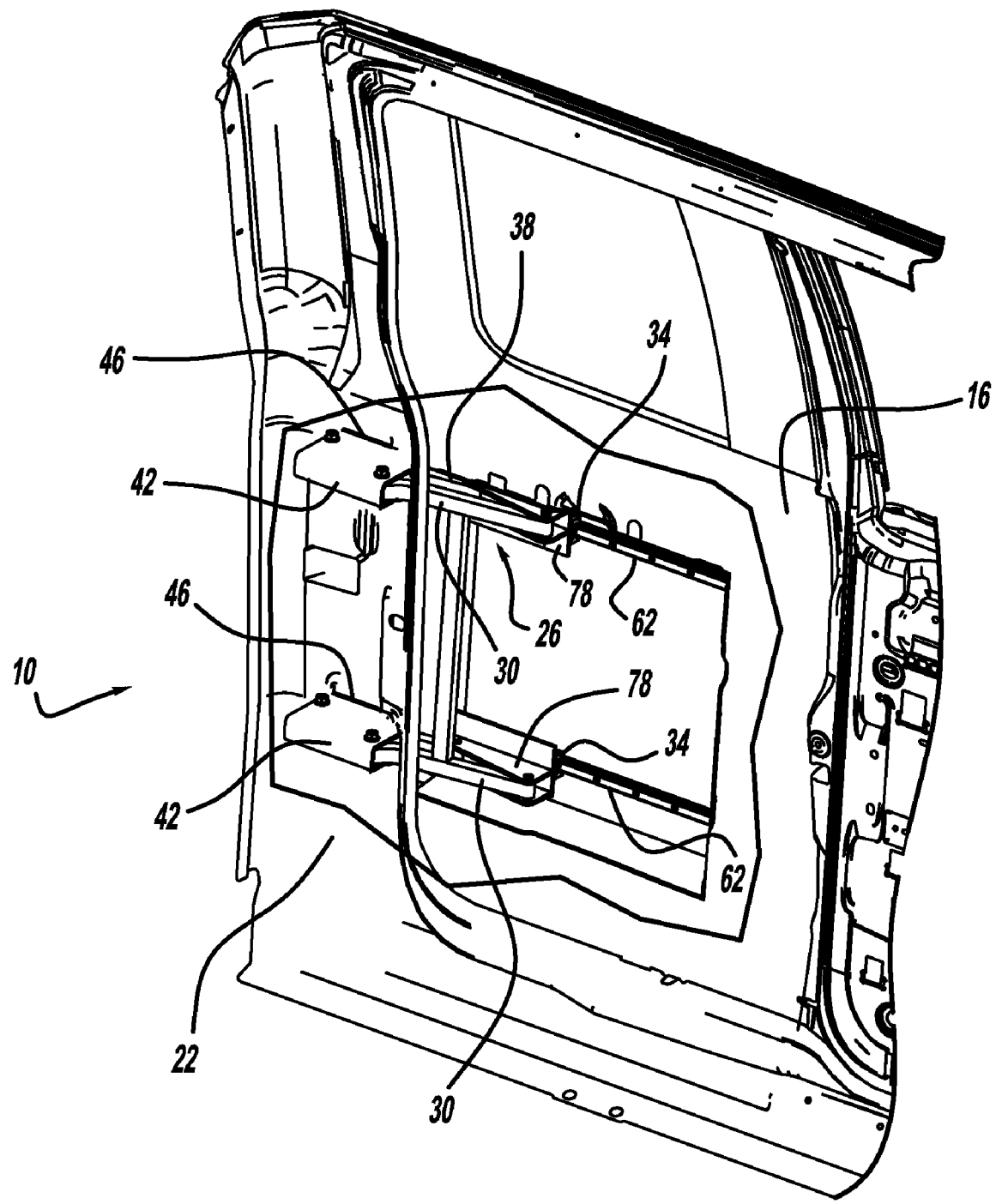
FIG. 2 is an isometric cutout view of the rear door articulating and sliding mechanism of FIG. 1, illustrating the mechanism installed onto a vehicle.
Figure 3:
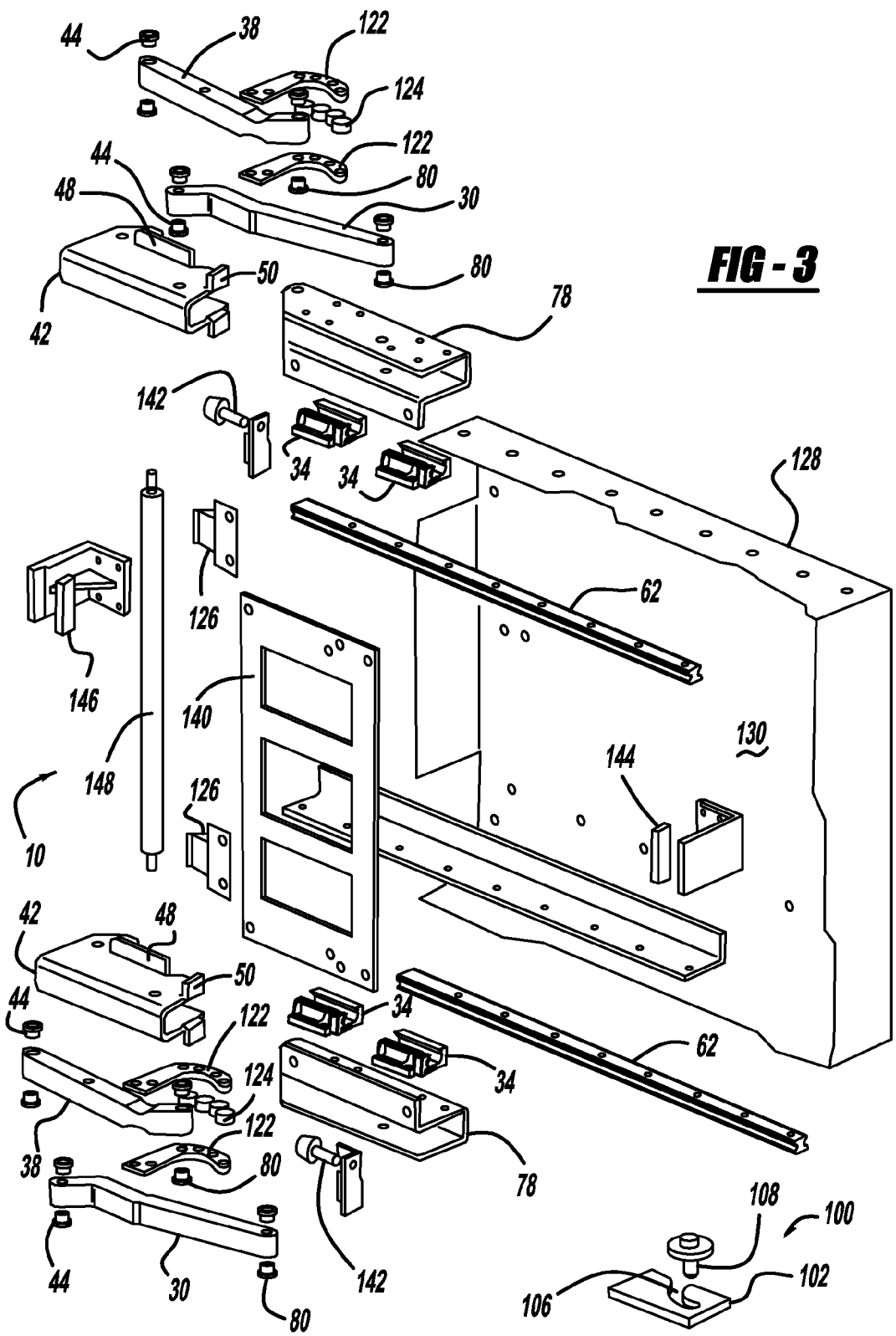
FIG. 3 is an exploded view of the rear door articulating and sliding mechanism of FIG. 1, illustrating the various sub-components of the mechanism.
Figure 4:
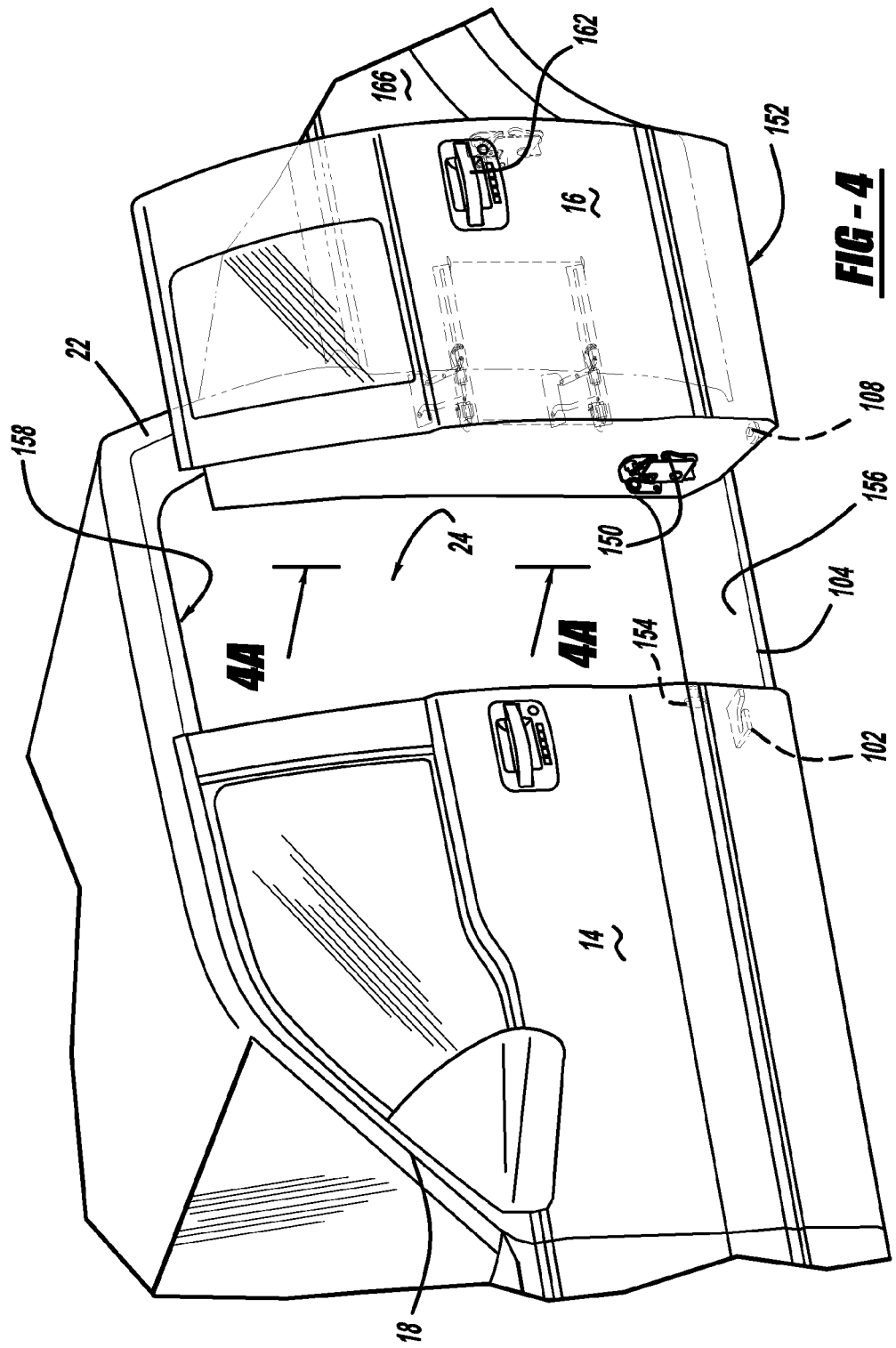
FIG. 4 is an isometric view of the rear door articulating and sliding mechanism of FIG. 1, illustrating the mechanism installed onto a vehicle and with a front vehicle door closed and a rear vehicle door fully opened (note FIG. 4A illustrates the rear door articulating and sliding mechanism from the direction marked in FIG. 4)
Figure 4A:
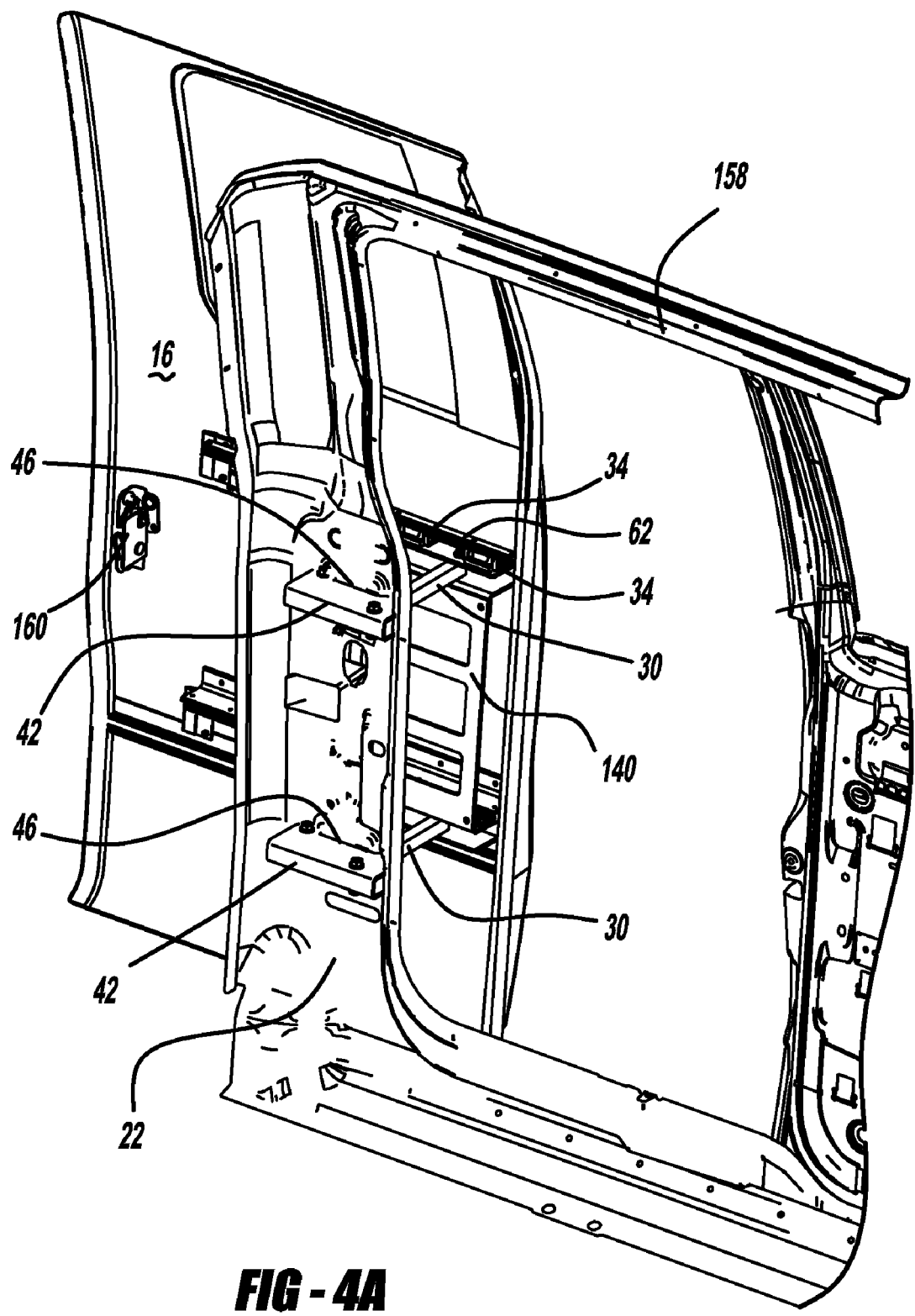
Figure 5:
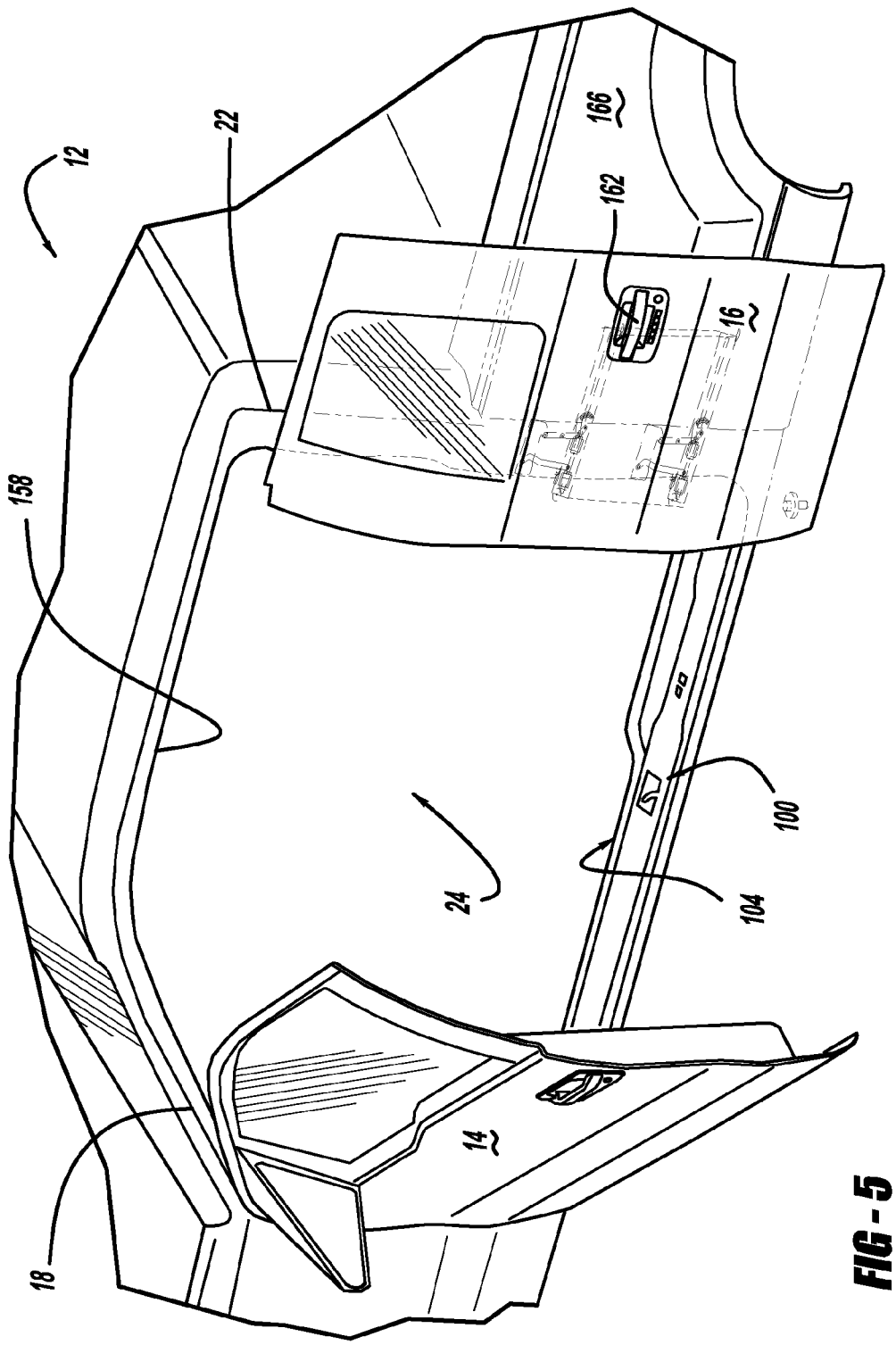
FIG. 5 is an isometric view of the rear door articulating and sliding mechanism of FIG. 1, illustrating the mechanism installed onto a vehicle and with the front and rear vehicle doors fully opened.

Referring to FIGS. 1-3, rear door articulating and sliding mechanism 10 may generally be mounted onto a vehicle 12 including front and rear doors 14, 16. In the exemplary embodiment illustrated, vehicle 12 may be a pickup truck including A, B and C pillars 18, 20, 22. As shown in FIGS. 4 and 5, and described in greater detail below, in order to facilitate ingress and egress into and from compartment 24 of vehicle 12, rear door articulating and sliding mechanism 10 may allow for complete opening of rear door 16, with front door 14 being fully opened or closed.

The various sub-components of rear door articulating and sliding mechanism 10 will now be described in detail with reference to FIGS. 1-10.

Specifically, as shown in FIGS. 1-3, rear door articulating and sliding mechanism 10 may generally include an articulating and sliding hinge assembly 26 pivotally interconnected at end 28 of inboard hinge arm 30 with C-pillar 22 via a hinge mount 42 and further pivotally interconnected at end 32 of inboard hinge arm 30 with slide blocks 34 via a hinge mount 78. Likewise, an end 36 of outboard hinge arm 38 may be pivotally interconnected with C-pillar 22 via hinge mount 42 and further pivotally interconnected at end 40 thereof with slide blocks 34 via hinge mount 78. Those skilled in the art would readily appreciate in view of this disclosure that mechanism 10 may be installed onto a vehicle D-pillar (not shown), or another body structure for facilitating articulated and sliding opening/closing of a door or another cover. As shown in FIG. 1, inboard hinge arm 30 may be longer than outboard hinge arm 38 for providing predetermined articulation of rear door 16. Hinge mounts 42, 78 may respectively include pivot pins 44, 80 about which each hinge arm 30, 38 pivotally rotates. In the exemplary embodiment illustrated, hinge mounts 42 may further be located in cutouts 46 provided in C-pillar 22. As shown in FIGS. 1-3, in an exemplary embodiment, hinge mount 42 may include first and second mounts 48, 50 for attachment to C-pillar 22 by means riveting, welding and the like.

Figure 6A:
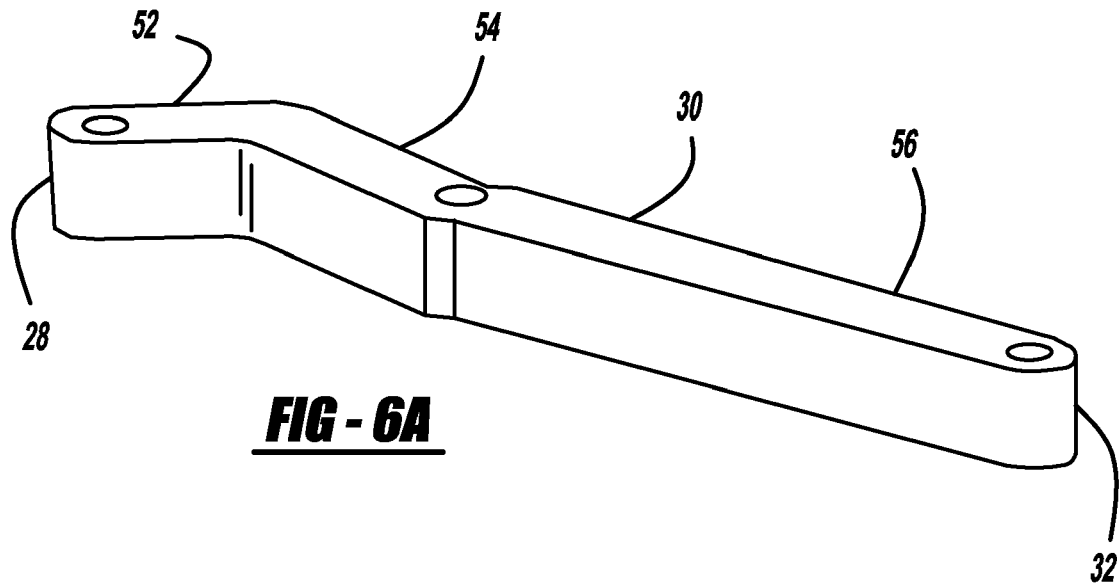
FIG. 6A is an enlarged isometric view of an inboard hinge arm for controlling pivotal movement of a rear vehicle door.
Figure 6B:
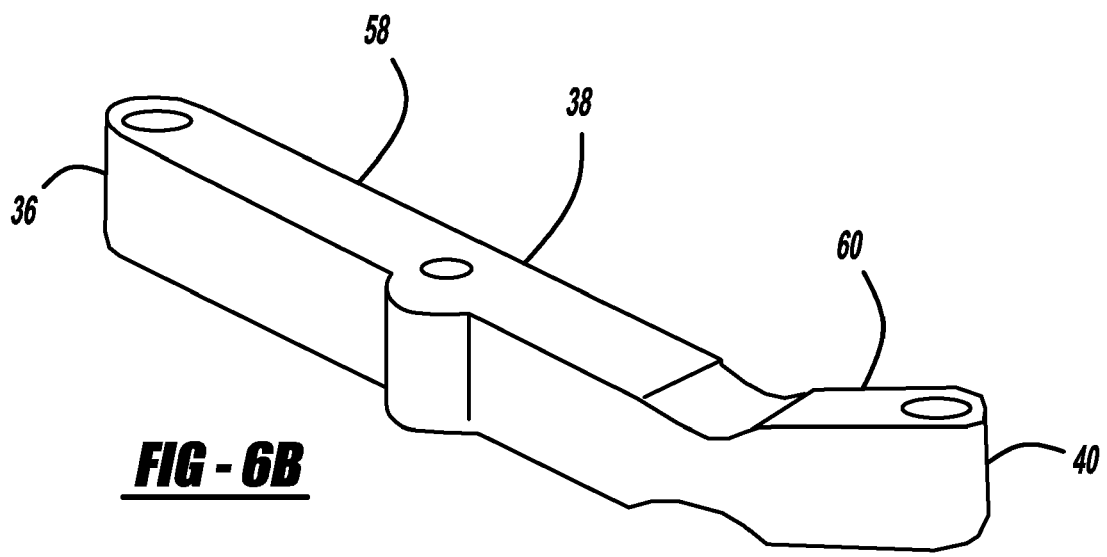
FIG. 6B is an enlarged isometric view of an outboard hinge arm for controlling pivotal movement of a rear vehicle door.
Figure 7A:
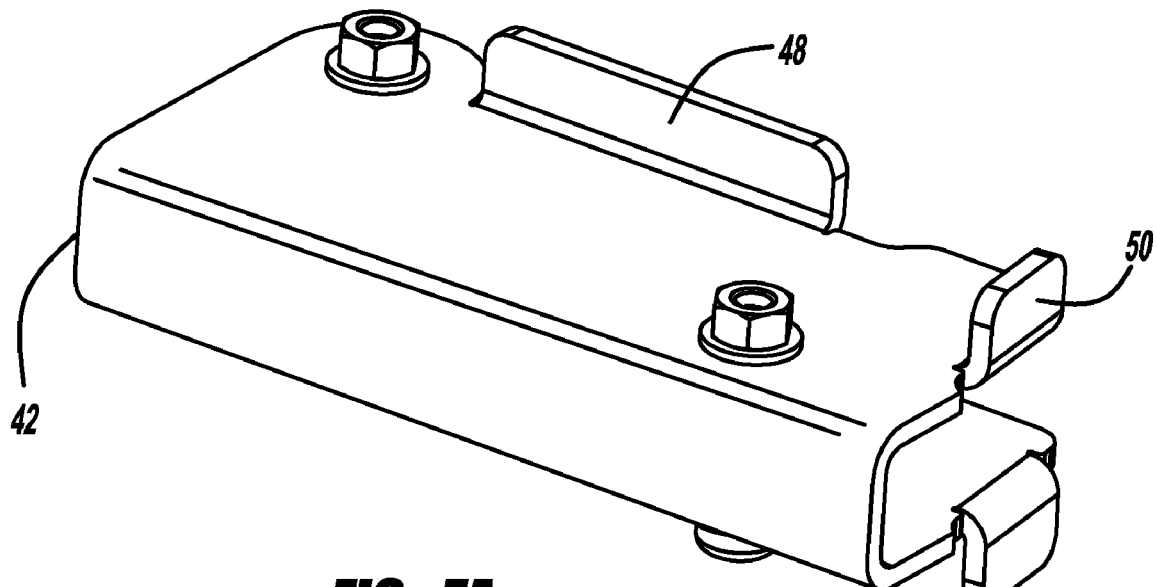
FIG. 7A is an enlarged isometric view of a hinge mount for attachment of the rear door articulating and sliding mechanism of FIG. 1 to a vehicle C-pillar.
Figure 7B:
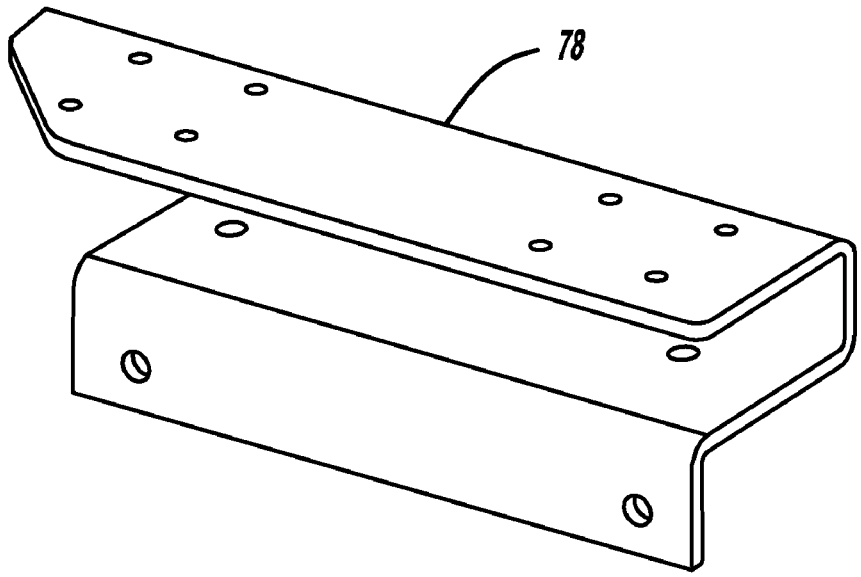
FIG. 7B is an enlarged isometric view of a hinge mount for attachment of the rear door articulating and sliding mechanism of FIG. 1 to a rear door.
Figure 8:
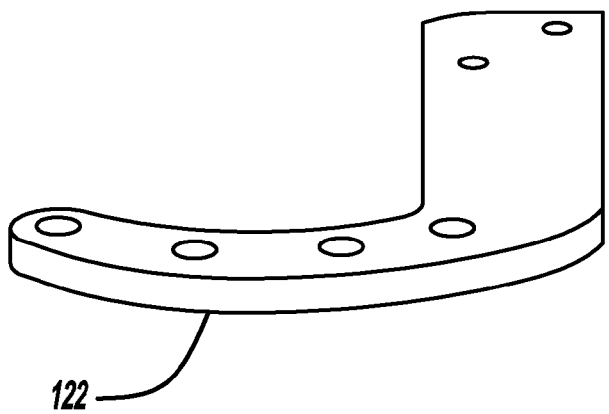
FIG. 8 is an enlarged isometric view of a finger of a lockout mechanism for selectively preventing articulation or sliding of a rear vehicle door.
Figure 9:
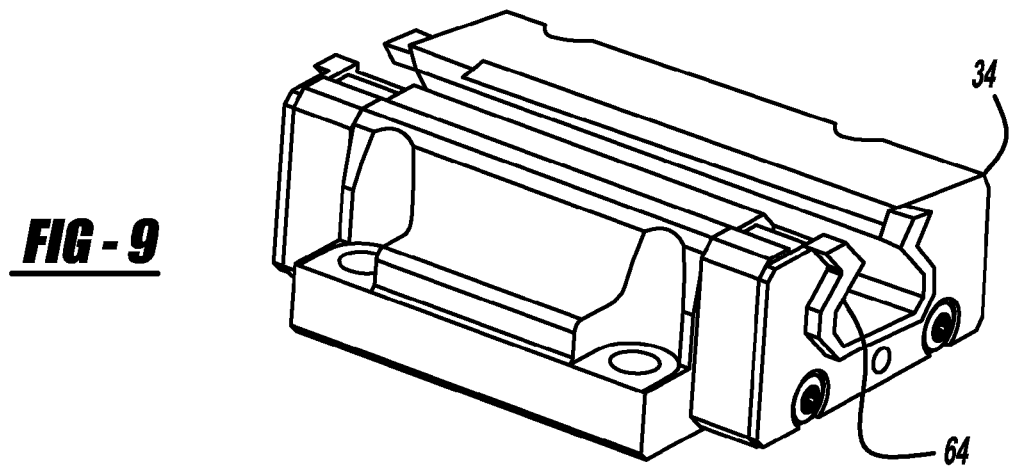
FIG. 9 is an enlarged isometric view of a slide block for facilitating sliding of a rear vehicle door.
Figure 10:
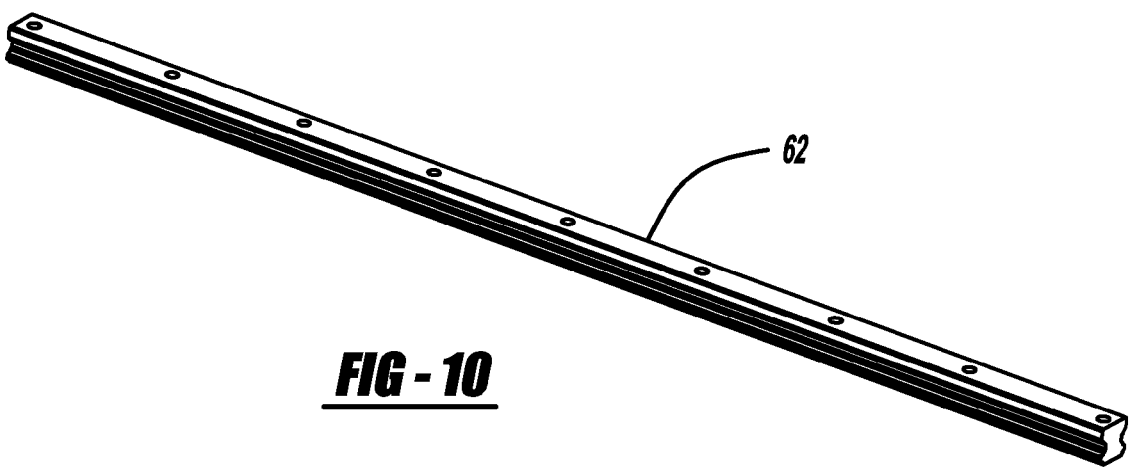
FIG. 10 is an enlarged isometric view of a rail for facilitating sliding of the slide block of FIG. 9.

Referring next to FIGS. 3 and 6A, in the exemplary embodiment illustrated, inboard hinge arm 30 may include a curved profile generally including sections 52, 54, 56 for facilitating predetermined articulation of rear door 16, and further, referring to FIGS. 3 and 7A, outboard hinge arm 38 may include a curved profile generally including sections 58, 60. As readily evident to those skilled in the art, hinge arms 30, 38 may be shaped in a variety of configurations based on the articulation requirements of rear door 16, and the orientation of door 16 relative to C-pillar 22.

Referring again to FIGS. 1-3, as discussed above, slide blocks 34 may be pivotally mounted on ends 32, 40 of each hinge arm 30, 38 for sliding relative to guide tracks 62 provided on rear door 16. In the exemplary embodiment illustrated, the sliding motion of slide blocks 34 may be facilitated by means of guide tracks 62 including bearing packs 64 provided on the underside of slide blocks 34 for rolling engagement with guide tracks 62, or alternatively, against polymer wheels disposable within the guide tracks. For example, referring to FIGS. 17A, 17B, 18A and 18B, these figures illustrate alternative embodiments of the aforementioned slide arrangements for facilitating sliding of rear door 16. Specifically, referring to FIGS. 17A and 17B, instead of slide blocks 34 and guide tracks 62, a slide block 66 including bearings may be disposed substantially within guide track 68 for sliding against grooves 70. Alternatively, referring to FIGS. 18A and 18B, a guide track 72 may include a slide block 74 having polymer coated wheels 76 for facilitating the sliding action. Those skilled in the art would readily appreciate in view of this disclosure that other means for facilitating sliding of slide blocks 34 relative to a guide track may be used as needed without departing from the scope of the invention.

Referring to FIGS. 1-3, guide tracks 62 may generally be formed as linear tracks for supporting slide blocks 34 and permitting relative movement thereof. As shown in FIG. 1, in the particular embodiment illustrated, articulating and sliding hinge assembly 26 may include two parallel guide tracks 62 provided for supporting rear door 16, likewise with two parallel sets of inboard and outboard hinge arms 30, 38 pivotally connected to slide blocks 34 via hinge mounts 78 and C-pillar 22 via hinge mounts 42. Those skilled in the art would however readily appreciate in view of this disclosure that articulating and sliding hinge assembly 26 may include additional or fewer components based on the stability and size of rear door and related components.

As shown in FIGS. 1-3, rear door articulating and sliding mechanism 10 may further include a lower guide assembly 100 including guide plate 102 mounted to floor structure 104. In the particular embodiment illustrated, guide plate 102 may include a channel 106 for facilitating guided movement of door 16 having guide pin 108 mounted on an underside thereof and slidably movable within channel 106 during door closing or initial opening. In this manner, whereas articulating and sliding hinge assembly 26 controls pivotal and sliding movement of rear door 16, lower guide assembly 100 further provides guided movement of door 16 during opening/closing thereof, and adequate alignment with the door latches as discussed in further detail below.

Referring next to FIGS. 1-3 and 11A-13B, articulation and slide control mechanism 120 will now be described in detail.

Figure 11A:
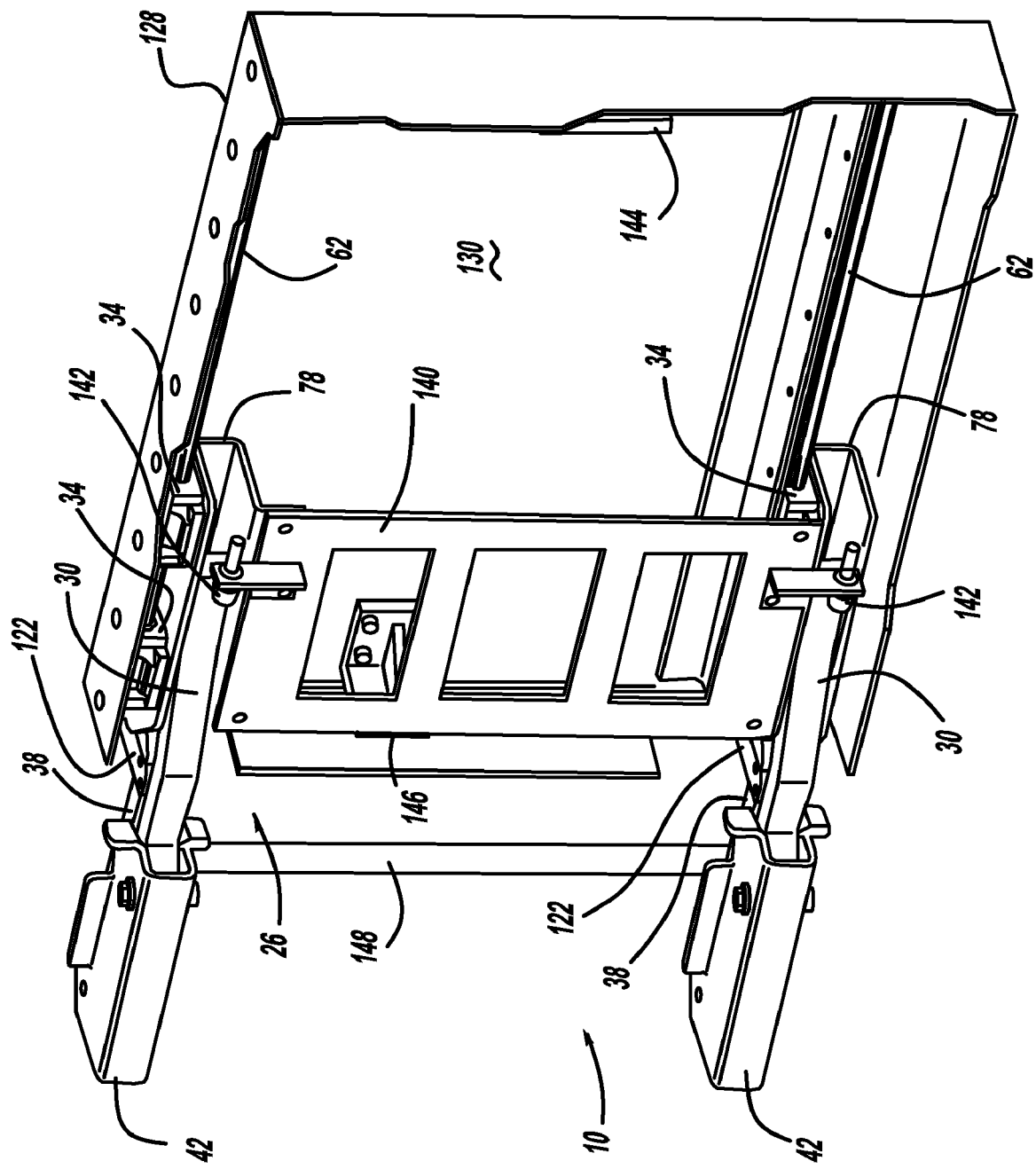
FIGS. 11A and 11B are isometric views of the rear door articulating and sliding mechanism of FIG. 1, illustrating the mechanism in a fully retracted position (i.e. rear door closed), and the related position of a lockout mechanism for preventing sliding and allowing only articulation of the rear door in the position shown (shown in top view)
Figure 11B:
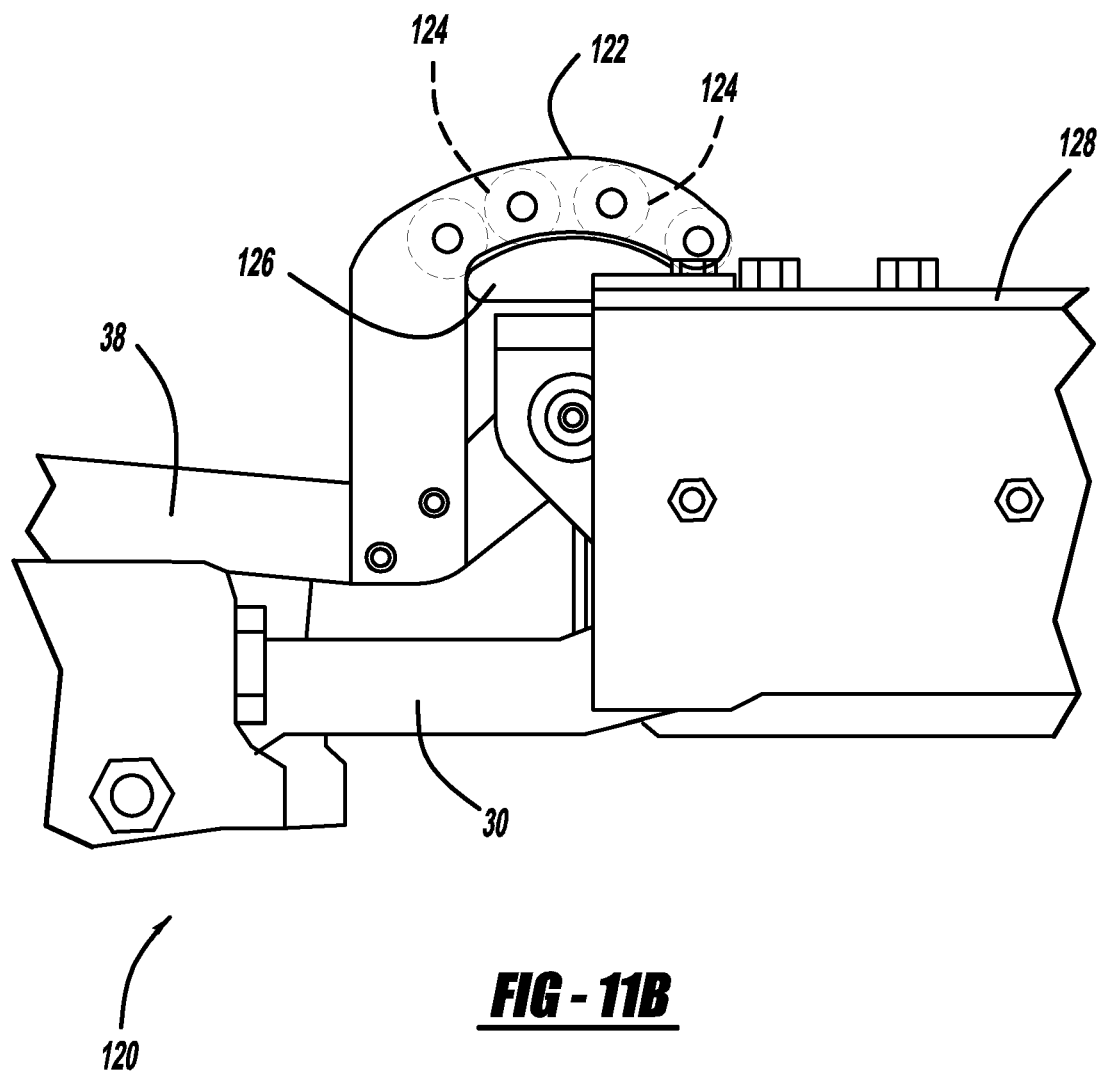
Figure 12A:
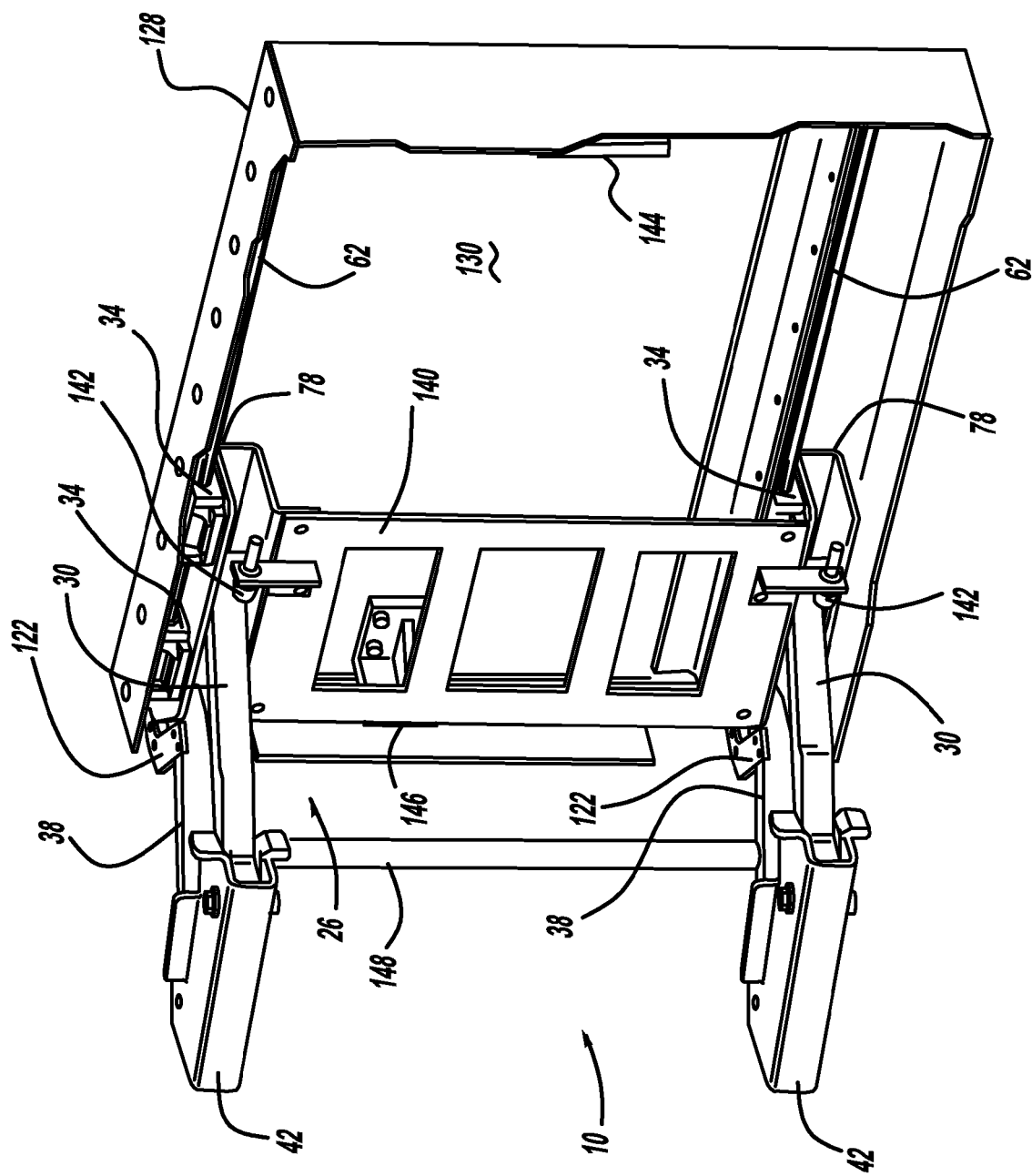
FIGS. 12A and 12B are isometric views of the rear door articulating and sliding mechanism of FIG. 1, illustrating the mechanism in a partial extended position (i.e. rear door just beginning to open), and the related position of the lockout mechanism of FIG. 11B for preventing sliding and allowing only articulation of the rear door in the position shown (shown in top view)
Figure 12B:
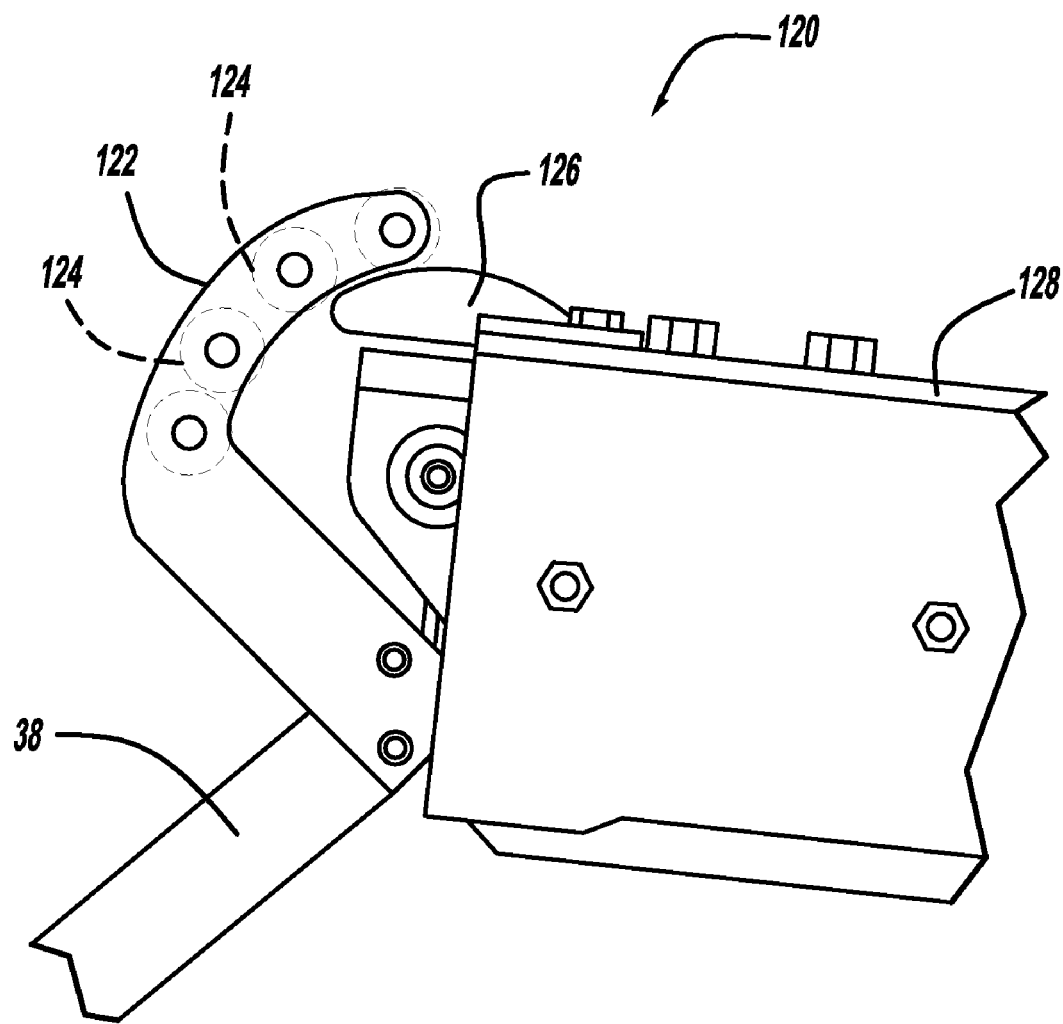
Figure 13A:
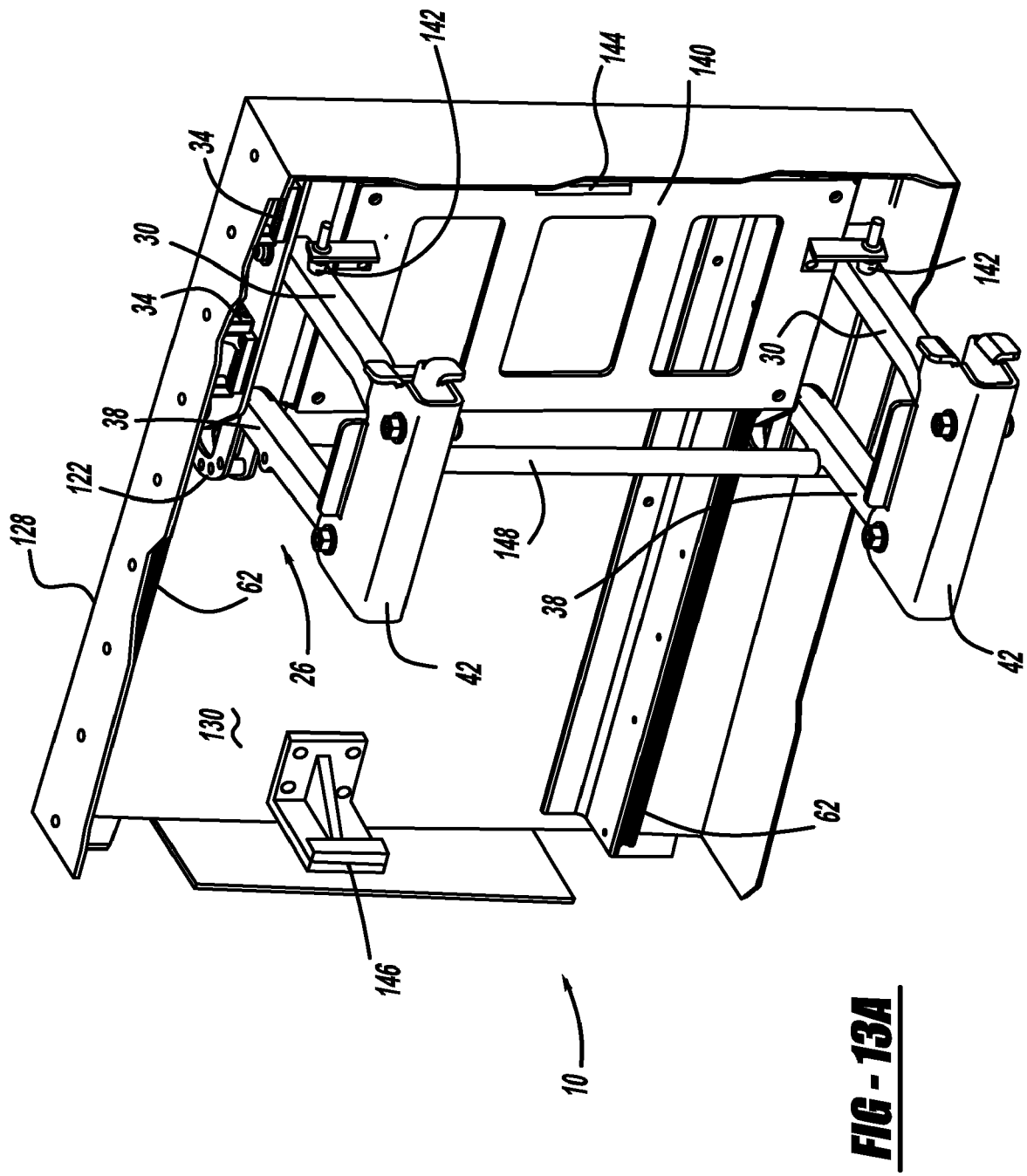
FIGS. 13A and 13B are isometric views of the rear door articulating and sliding mechanism of FIG. 1, illustrating the mechanism in a fully extended position (i.e. rear door open), and the related position of the lockout mechanism of FIG. 11B for allowing sliding, while preventing articulation, of the rear door in the position shown (shown in top view)
Figure 13B:
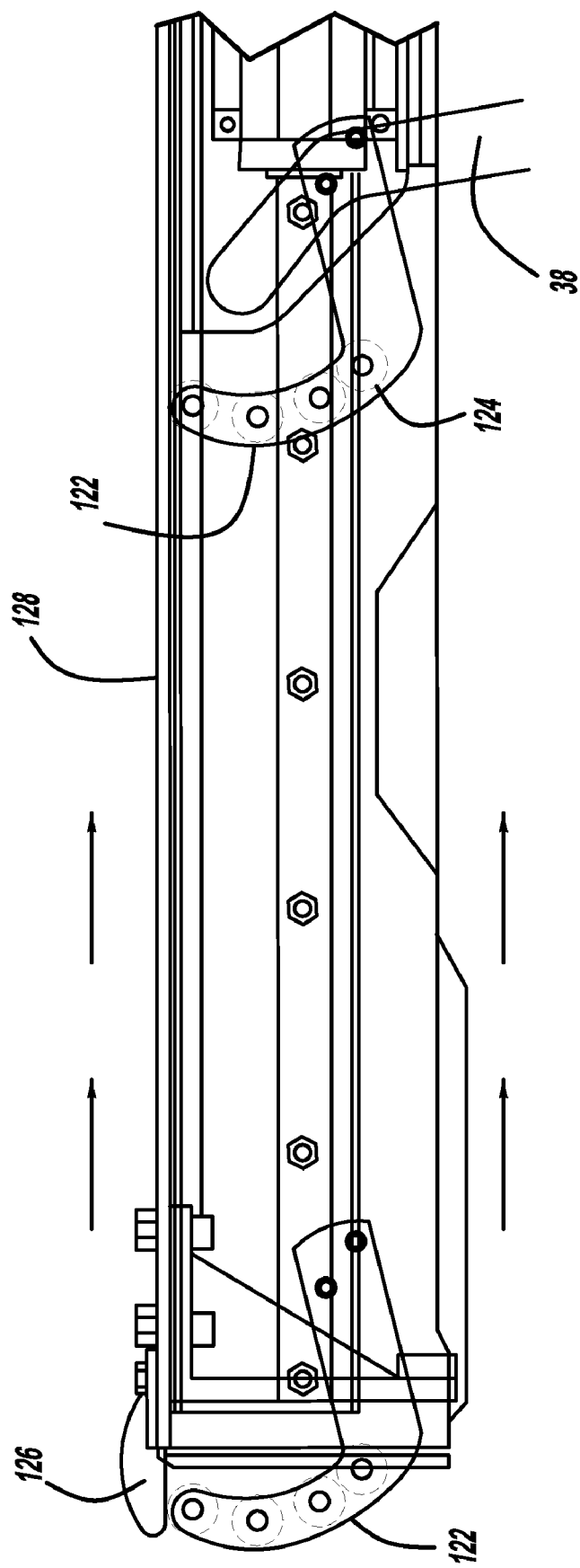

Specifically, as shown in FIGS. 11A and 11B, in order to prevent rear door 16 from sliding during initial opening thereof or articulating during continued sliding movement thereof, articulation and slide control mechanism 120 may include curved fingers 122 mounted to outboard hinge arms 38. Fingers 122 may include a plurality of rollers 124 disposed in contact with cammed lockout tab 126 extending from (or formed with) housing 128. As shown in FIGS. 11A and 11B, when rear door 16 is closed, fingers 122 and rollers 124 thereof may be contiguously engaged with cammed lockout tab 126. Referring to FIG. 12A and 12B, as rear door 16 is being opened (the opening/closing of rear door 16 being discussed in greater detail below), rollers 124 maintain engagement with cammed lockout tab 126 to prevent sliding of slide blocks 34 along guide tracks 62, and fingers 122 thus only allow for articulation of door 16. Referring to FIGS. 13A and 13B, once fingers 122 clear cammed lockout tab 126, fingers 122 may slide against back surface 130 of housing 128, and the sliding engagement of slide blocks 34 on guide tracks 62 allows only sliding (as opposed to articulation) of door 16. When rear door 16 is again moved from its fully open position of FIGS. 13A and 13B to the closed position of FIGS. 11A and 11B, the dimensional layout of inboard and outboard hinge arms 30, 38 as well as the length of guide tracks 62 factor to cause door 16 to move toward the vehicle centerline position, and the simultaneous engagement of pin 108 with guide plate 102 causes re-engagement of fingers 122 with cammed lockout tab 126 to articulate door 16 to the fully closed position.

Referring again to FIGS. 1-3, the entire assembly of rear door articulating and sliding mechanism 10 may further include a mounting plate 140 for mounting of stops 142 (see FIG. 13A) which engage inboard arms 30 to limit opening of door 16. As also shown in FIGS. 1-3 and 13A, an additional open limit stop 144 may be provided and mounted to housing 128 for further limiting opening of door 16 and simultaneously preventing any rattling thereof. Yet further, referring again to FIG. 13A, a mirror-image close limit stop 146 may be provided for limiting closing movement of door 16 and simultaneously preventing any rattling thereof. Rear door articulating and sliding mechanism 10 may also include a tie rod 148 for maintaining and stabilizing inboard and outboard hinge arms 30, 38 during movement of door 16.

In order to latch/unlatch rear door 16, door 16 may include a latch 150 provided adjacent lower end 152 thereof and engageable with striker 154 provided adjacent lower end 156 of door opening frame 158. Door 16 may further include a latch 160 operable via release handle 162 in a conventional manner, with latch 160 being engageable with striker 164. As readily evident to those skilled in the art, in order to efficiently open and close door 16, handle 162 may be a pull-type handle as shown, whereby a user may grasp onto handle 162 and pull and slide rear door 16 to open or close the door as needed.

The opening/closing of rear door 16 will now be described in detail with reference to FIGS. 1-16B (especially FIGS. 4-16B).

Referring to FIGS. 4 and 5, as discussed above, in order to facilitate ingress and egress into and from compartment 24 of vehicle 12, rear door articulating and sliding mechanism 10 may allow for complete opening of rear door 16, with front door 14 being fully opened or closed.

Figure 14A:
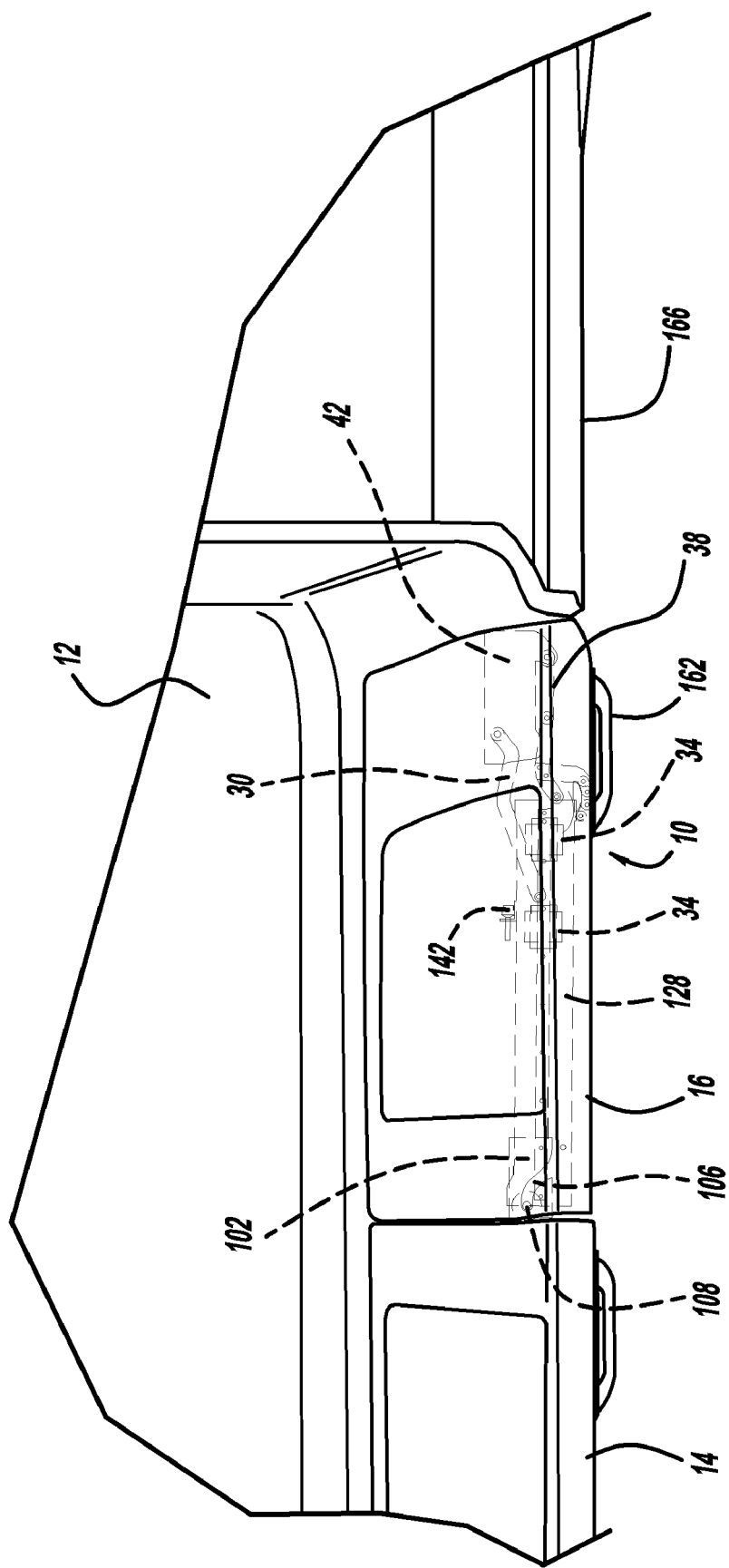
Figure 14B:
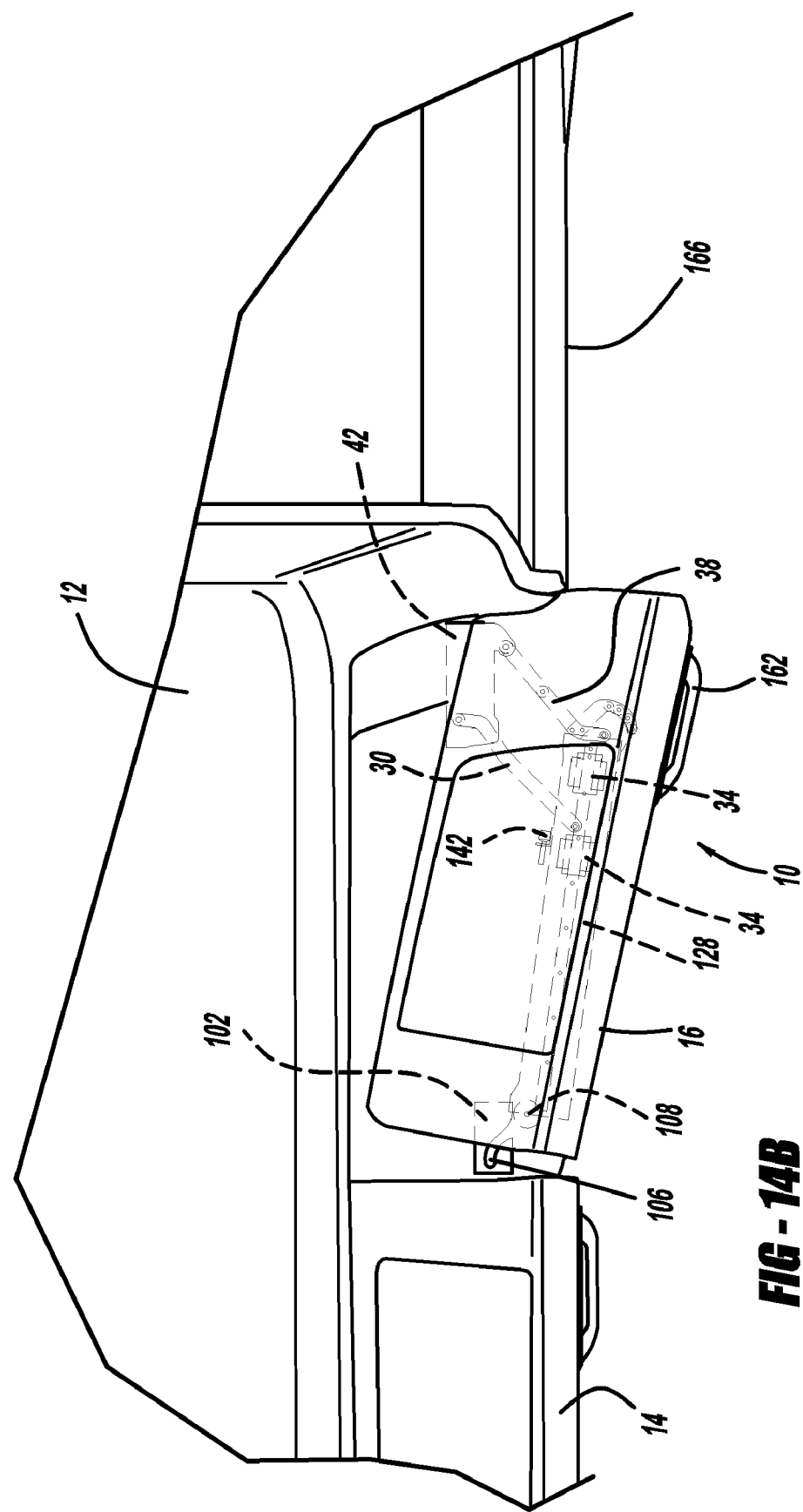
Figure 14D:
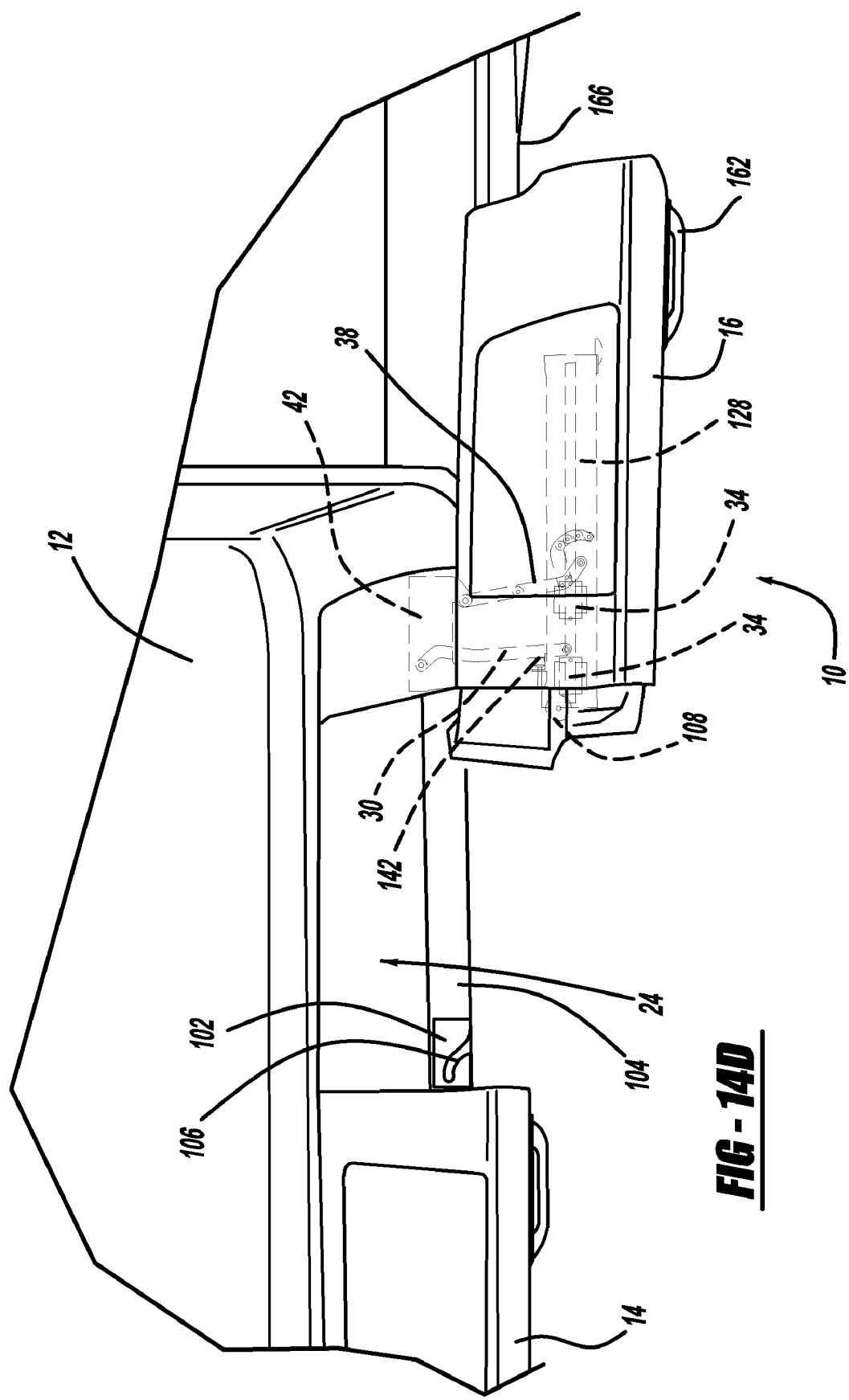

Referring to FIGS. 14A-14D, these figures generally include top views of vehicle 12 with rear door 16 respectively illustrated in a closed, just beginning to open, opened midway and fully opened positions, with front door 14 open. As shown in FIG. 14A, in the rear door closed position, inboard and outboard hinge arms 30, 38 may be disposed generally adjacent guide tracks 62. As rear door 16 is just beginning to open in the FIG. 14B configuration, inboard and outboard hinge arms 30, 38 may rotate in a counter clockwise direction in the FIG. 14B orientation. At the same time, referring to FIGS.

11A-12B and the discussion above, rollers 124 of fingers 122 maintain engagement with cammed lockout tab 126 to prevent sliding of rear door 16 along guide tracks 62, and fingers 122 thus only allow articulation of door 16. With continued opening of rear door 16 as shown in FIG. 14C, slide blocks 34 may begin to translate relative to guide tracks 62, with continued pivotal movement of inboard and outboard hinge arms 30, 38. At the same time, referring to FIGS. 12A-13B and the discussion above, once fingers 122 clear cammed lockout tab 126, fingers 122 may slide against back surface 130 of housing 128, and the sliding engagement of slide blocks 34 on guide tracks 62 allows only sliding (as opposed to articulation) of door 16. Lastly, referring to FIG. 14D, from the FIG. 14C to the FIG. 14D positions, rear door 16 may continue to translate parallel to vehicle body 166 with translation of slide blocks 34 on guide tracks 62.

Figure 15A:
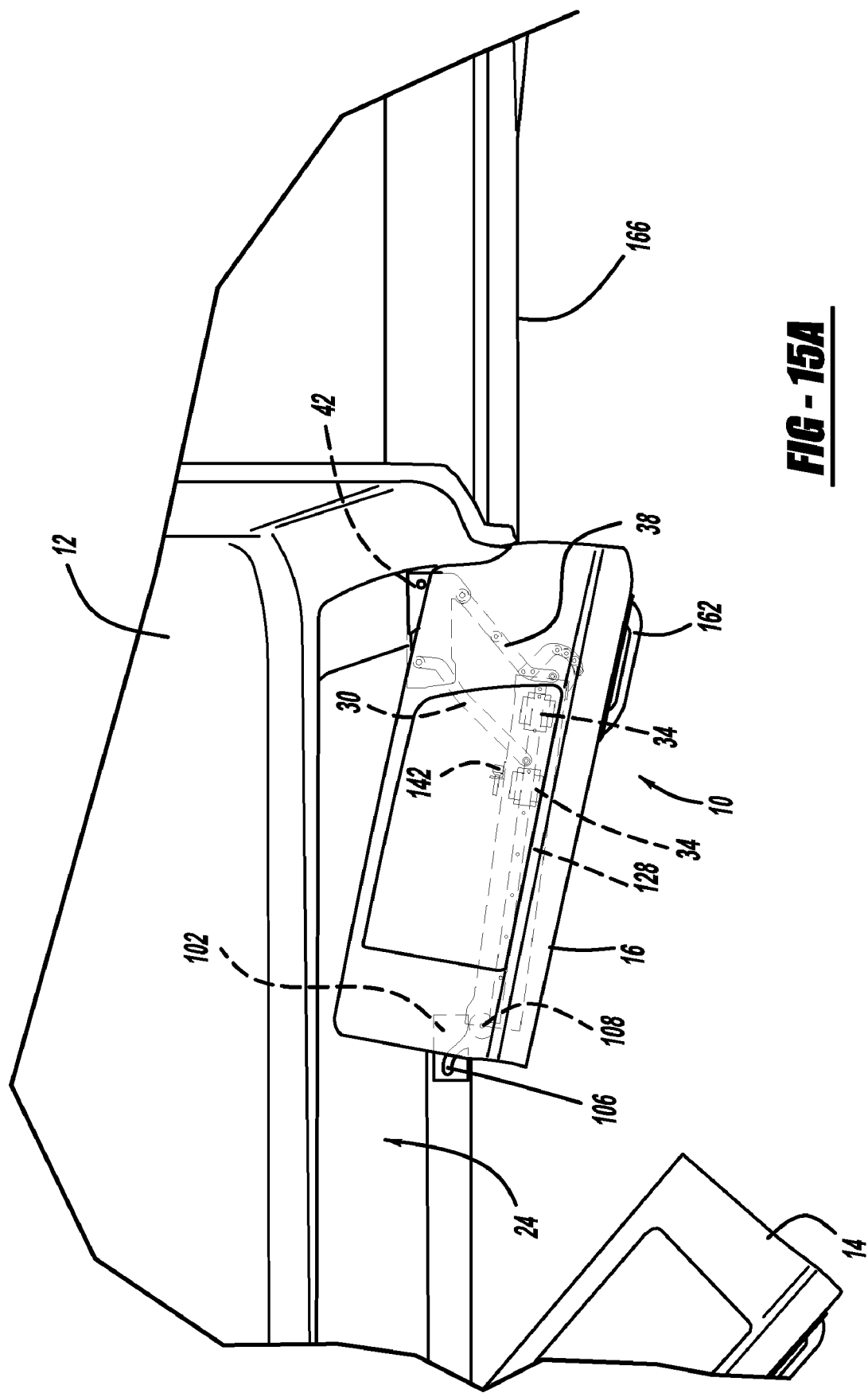
Figure 16A:
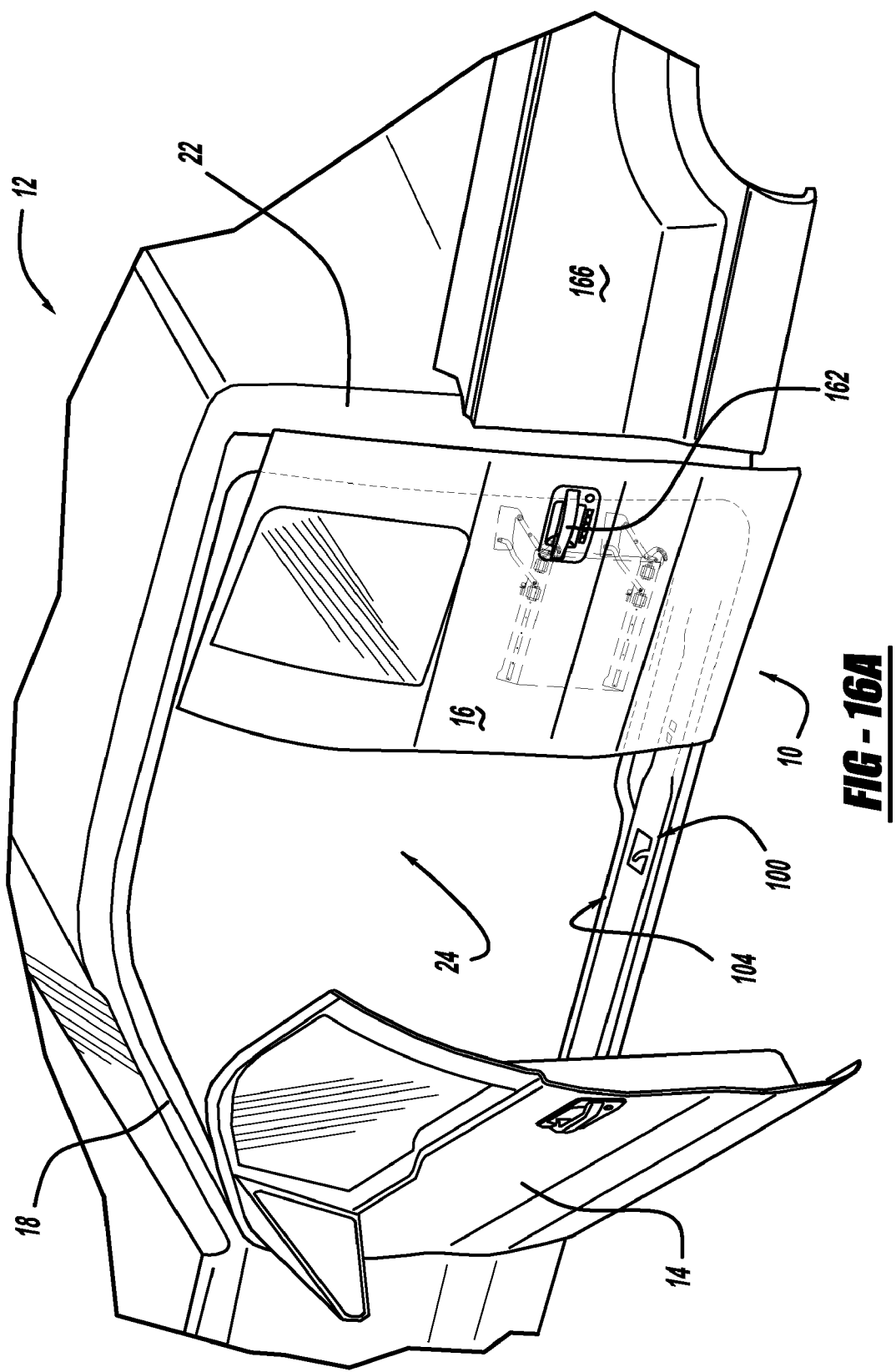
FIGS. 16A and 16B are isometric views of a vehicle including the rear door articulating and sliding mechanism of FIG. 1, respectively illustrating the rear vehicle door in a just beginning to open and fully opened positions, with the front vehicle door open.
Figure 16B:
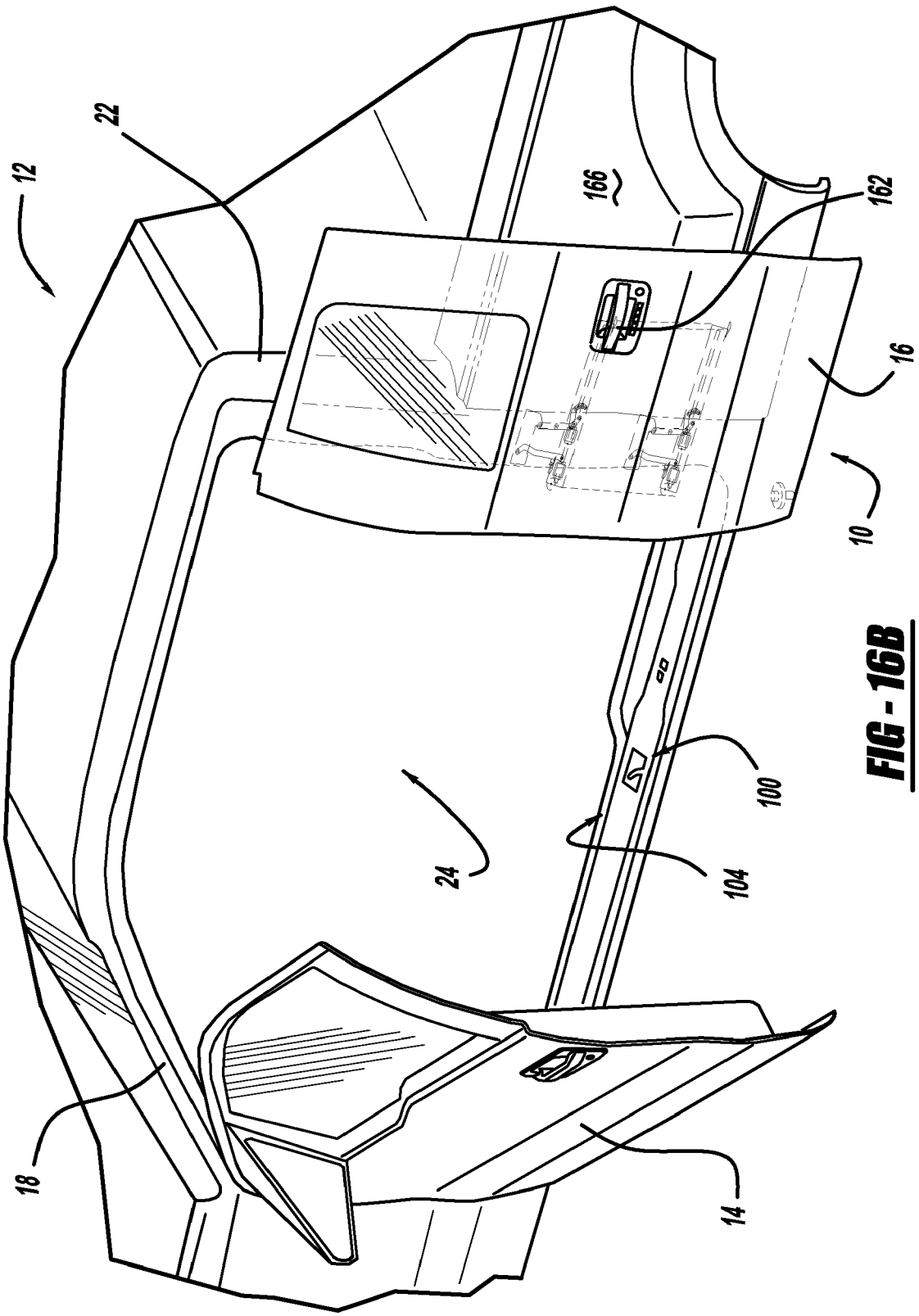
Figure 17A:
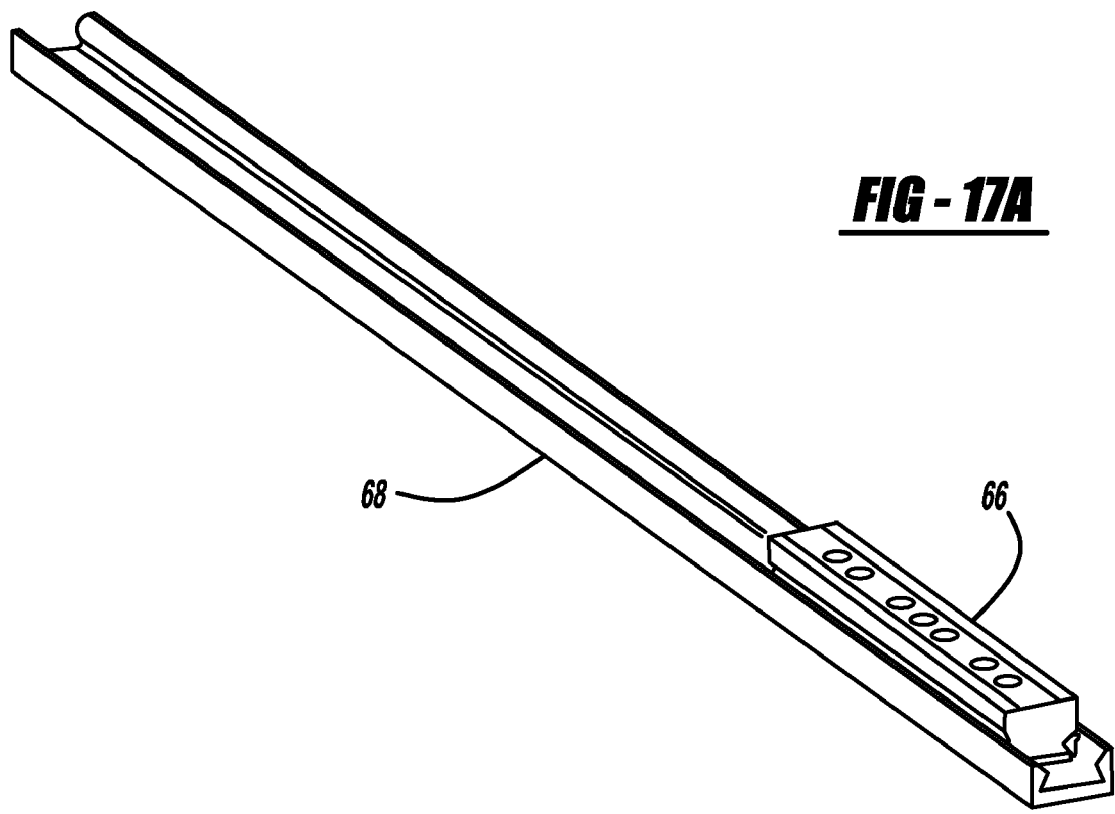
FIGS. 17A and 17B illustrate a first alternative embodiment of slide arrangements for use with the rear door articulating and sliding mechanism of FIG. 1.
Figure 17B:
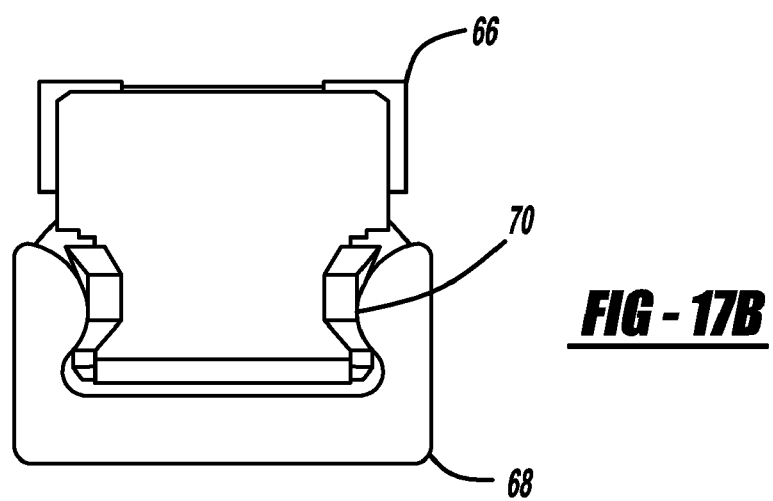
Figure 18A:
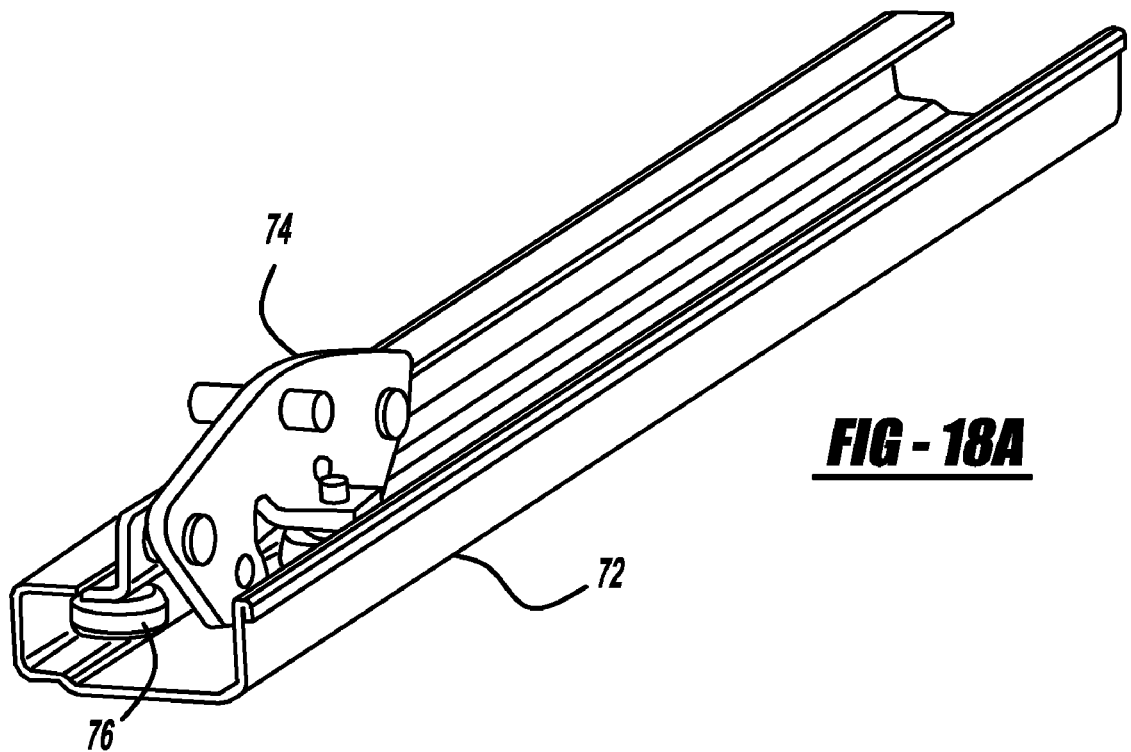
FIGS. 18A and 18B illustrate a second alternative embodiment of slide arrangements for use with the rear door articulating and sliding mechanism of FIG. 1.
Figure 18B:
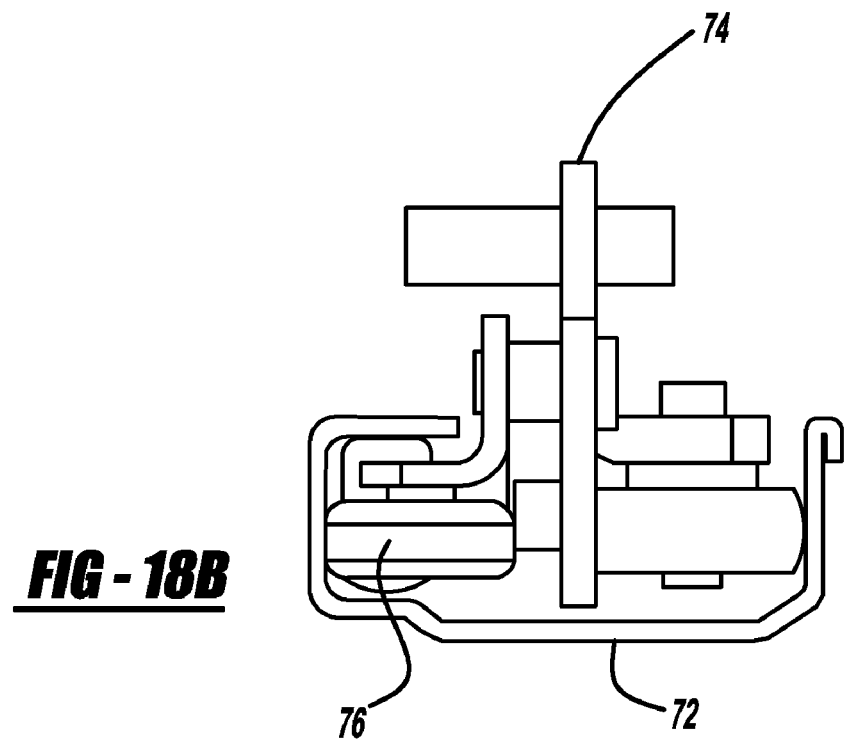

As discussed above, since rear door articulating and sliding mechanism 10 may allow for complete opening of rear door 16, with front door 14 being fully opened or closed, referring to FIGS. 15A, 15B, 16A and 16B, in a similar manner as discussed above with reference to FIGS. 14A-14D, the opening of rear door 16 is illustrated from the just beginning to open position of FIGS. 15A, 16A to the fully opened position of FIGS. 15B, 16B, with front door 14 open.

To summarize, the invention thus provides rear door articulating and sliding mechanism 10 for vehicle rear door articulation, with the system permitting opening and closing of a rear door with or without a front door being opened. The system requires minimal modification of a vehicle structure, in that, components such as hinge mounts 42, 78 and guide tracks 62 can be installed by minimal modification to a C-pillar area or the rear door and roof structure. The invention facilitates case of ingress and egress and allows maximum access for loading and unloading of transportable items. Based on the discussion above, the mode of opening of rear door 16 is not constrained by parking lot restrictions that limit conventional door opening when adjacent to another vehicle or object that prevents full rotation of a conventional hinged door. Thus, parking lot entrapment, which prevents access to the door openings in such situations, is thereby avoided.

Those skilled in the art would readily appreciate in view of this disclosure that various modifications could be made to the aforementioned components, without departing from the scope of the present invention. For example, as discussed above, whereas mechanism 10 has been described and illustrated as including an articulating and sliding hinge assembly 26 including parallel disposed upper and lower inboard and outboard hinge arms 30, 38 (see FIGS. 1-3), additional or fewer hinge components (i.e. one or more pairs of hinge arms and related components) may be provided based on the stability and size of the rear door and related components. Further, whereas inboard and outboard hinge arms 30, 38 have been illustrated as including a curved profile for facilitating predetermined articulation and sliding of rear door 16, the curvature of arms 30, 38 may be varied as needed for controlling movement of door 16. Yet further, whereas vehicle 12 equipped with mechanism 10 may include a latch 150 disposed at lower end 152 of door 16 engageable with striker 154 provided at lower end 156 of door opening frame 158, additional latches/strikers may be provided at the upper end or other areas of door 16 and door opening frame 158. Further, whereas mechanism 10 has been described as including articulation and slide control mechanism 120, a variety of other lockout mechanisms that selectively allow/prevent articulation or sliding of a door structure may be used in conjunction with or in lieu of mechanism 120. Yet further, whereas mechanism 10 has been described as being usable with rear door 16 in the exemplary embodiment illustrated, it is readily evident that mechanism 10 may be usable with a vehicle front, middle or other doors, or with a compartment closure (i.e. broadly a vehicle door for the occupant compartment or another compartment for storing objects), or a tailgate assembly, for facilitating the afore-described articulating/sliding operation. Moreover, whereas door 16 has been discussed as being manually operable via handle 162, mechanism 10 may be used with an automatic door 16 operable, for example, by a remote or vehicle mounted push-button.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle rear door articulating and sliding mechanism comprising:

at least one articulating hinge assembly including:

at least one hinge arm pivotally mounted to a vehicle C-pillar at one end thereof;

a vehicle rear door pivotally and slidably mounted to said hinge arm at an opposite end of said hinge arm;

at least one guide track mounted to the vehicle rear door; and at least one slide block pivotally mounted to said hinge arm and slidably attached to said guide track, wherein said hinge arm is disposed at first and second angular positions relative to said guide track when the vehicle rear door is respectively disposed in closed and opened positions, and said slide block is disposed at first and second positions along a length of said guide track when the vehicle rear door is respectively disposed in the closed and opened positions, whereby, said vehicle rear door articulating and sliding mechanism provides articulating movement of the vehicle rear door, independent of a vehicle front door, during initial opening thereof and further provides sliding movement of the vehicle rear door relative to the vehicle body during continued opening thereof, wherein said slide block is pivotally mounted to said opposite end of said hinge arm, and wherein said opposite end of said hinge arm further includes a fixedly mounted curved finger engageable with a complementary curved lockout tab provided on the vehicle rear door for preventing sliding movement of the vehicle rear door during articulating movement of the vehicle rear door, and wherein said curved finger is rotated about the curved lockout tab to a location below the curved lockout tab such that the curved finger is disengageable from said complementary curved lockout tab for allowing sliding movement of the vehicle rear door and preventing articulating movement of the vehicle rear door.

2. A vehicle rear door articulating and sliding mechanism according to claim 1, wherein said curved finger includes at least one roller engageable with said complementary curved lockout tab.

3. A vehicle rear door articulating and sliding mechanism according to claim 1, further comprising at least one upper and lower hinge assembly each respectively including at least two hinge arms for forming a multi-bar articulating and sliding mechanism.

4. A vehicle rear door articulating and sliding mechanism according to claim 1, further comprising a tie-rod connected to an upper and lower hinge arm for thereby providing rigidity for simultaneous operation of upper and lower hinge assemblies.

5. A vehicle door articulating and sliding mechanism comprising:
at least one articulating hinge assembly including:
at least one hinge arm pivotally mounted to a vehicle body structure at one end thereof;
a vehicle door pivotally and slidably mounted to said hinge arm at an opposite end of said hinge arm;
at least one guide track mounted to the vehicle door; and
at least one slide block pivotally mounted to said hinge arm and slidably attached to said guide track,
wherein said hinge arm is disposed at first and second angular positions relative to said guide track when the vehicle door is respectively disposed in closed and opened positions, and said slide block is disposed at first and second positions along a length of said guide track when the vehicle door is respectively disposed in the closed and opened positions, whereby, said vehicle door articulating and sliding mechanism provides articulating movement of the vehicle door during initial opening thereof and further provides sliding movement of the vehicle door relative to the vehicle body during continued opening thereof, wherein said slide block is pivotally mounted to said opposite end of said hinge arm, and wherein said opposite end of said hinge arm further includes a fixedly mounted curved finger engageable with a complementary curved lockout tab provided on the vehicle door for preventing sliding movement of the vehicle door during articulating movement of the vehicle door, and wherein said curved finger is rotated about the curved lockout tab to a location below the curved lockout tab such that the curved finger is disengageable from said complementary curved lockout tab for allowing sliding movement of the vehicle door and preventing articulating movement of the vehicle door.

6. A vehicle door articulating and sliding mechanism according to claim 5, wherein said mechanism provides articulating movement of the vehicle door, independent of a vehicle adjacent door.

7. A vehicle door articulating and sliding mechanism according to claim 5, wherein said curved finger includes at least one roller engageable with said complementary curved lockout tab.

8. A vehicle door articulating and sliding mechanism according to claim 5, further comprising at least one upper and lower hinge assembly each respectively including at least two hinge arms for forming a multi-bar articulating and sliding mechanism.

9. A vehicle door articulating and sliding mechanism according to claim 5, further comprising a tie-rod connected to an upper and lower hinge arm for thereby providing rigidity for simultaneous operation of upper and lower hinge assemblies.

10. A vehicle compartment closure articulating and sliding mechanism comprising:
at least one articulating hinge assembly including:
at least one hinge arm pivotally mounted to a vehicle body structure at one end thereof;
a compartment closure pivotally and slidably mounted to said hinge arm at an opposite end of said hinge arm;
at least one guide track mounted to the compartment closure; and
at least one slide block pivotally mounted to said hinge arm and slidably attached to said guide track,
wherein said hinge arm is disposed at first and second angular positions relative to said guide track when the compartment closure is respectively disposed in closed and opened positions, and said slide block is disposed at first and second positions along a length of said guide track when the compartment closure is respectively disposed in the closed and opened positions, whereby, said compartment closure articulating and sliding mechanism provides articulating movement of the compartment closure during initial opening thereof and further provides sliding movement of the compartment closure relative to a vehicle body structure during continued opening thereof, wherein said slide block is pivotally mounted to said opposite end of said hinge arm, and wherein said opposite end of said hinge arm further includes a fixedly mounted curved finger engageable with a complementary curved lockout tab provided on the compartment closure for preventing sliding movement of the compartment closure during articulating movement of the compartment closure, and wherein said curved finger is rotated about the curved lockout tab to a location below the curved lockout tab such that the curved finger is disengageable from said complementary curved lockout tab for allowing sliding movement of the compartment closure and preventing articulating movement of the compartment closure.

11. A vehicle compartment closure articulating and sliding mechanism according to claim 10, wherein said curved finger includes at least one roller engageable with said complementary curved lockout tab.

12. A vehicle compartment closure articulating and sliding mechanism according to claim 10, further comprising at least two hinge assemblies each respectively including at least two hinge arms for forming a multi-bar articulating and sliding mechanism.

13. A vehicle compartment closure articulating and sliding mechanism according to claim 10, further comprising a tie-rod connected to at least two hinge arms for thereby providing rigidity for simultaneous operation of at least two hinge assemblies respectively including said at least two hinge arms.

14. A door mechanism comprising:
a hinge assembly including a hinge arm pivotally and slidably mounted to a door; and
a slide block mounted to the hinge arm and slidably attached to a guide track,
wherein the hinge arm comprises a curved finger engageable with a complementary curved lockout tab for preventing sliding movement of the door during articulating movement and rotatable about the curved lockout tab to a location below the curved lockout tab such that the curved finger is disengageable from the lockout tab for preventing articulating movement of the door during sliding movement.

15. The door mechanism according to claim 14, wherein the hinge assembly comprises at least two hinge arms for forming a multi-bar articulating and sliding mechanism.

* * * * *